United States Patent
Oh et al.

(10) Patent No.: US 11,529,876 B2
(45) Date of Patent: Dec. 20, 2022

(54) CONTROL METHOD FOR GENERATING VIRTUAL SENSATION OF GEAR SHIFTING OF ELECTRIC VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 200 days.

(21) Appl. No.: 17/102,906

(22) Filed: Nov. 24, 2020

(65) Prior Publication Data

US 2021/0387530 A1 Dec. 16, 2021

(30) Foreign Application Priority Data

Jun. 10, 2020 (KR) .................. 10-2020-0070003

(51) Int. Cl.
*B60L 15/20* (2006.01)

(52) U.S. Cl.
CPC ........... *B60L 15/20* (2013.01); *B60L 2240/42* (2013.01); *B60L 2250/16* (2013.01)

(58) Field of Classification Search
CPC ... B60L 15/20; B60L 2240/42; B60L 2250/16
See application file for complete search history.

(56) References Cited

U.S. PATENT DOCUMENTS

| | | | |
|---|---|---|---|
| 9,573,473 B2* | 2/2017 | Akiyama | B60L 7/14 |
| 2008/0078647 A1* | 4/2008 | Watanabe | F16D 41/067 192/41 A |
| 2016/0221446 A1* | 8/2016 | Suzuki | B60L 58/20 |
| 2019/0106126 A1* | 4/2019 | Hashimoto | B61C 9/46 |

* cited by examiner

*Primary Examiner* — Gertrude Arthur Jeanglaude
(74) *Attorney, Agent, or Firm* — Fox Rothschild LLP

(57) ABSTRACT

A control method of an electric vehicle is provided. The method includes generation of a virtual sensation of gear shifting of an electric vehicle capable of freely, directly changing and adjusting variables related to generation of the virtual sensation of gear shifting to provide drivers with preferred virtual sensation of gear shifting. The virtual sensation of gear shifting is generated according to driver's driving input values and vehicle conditions based on variable values related to the virtual sensation of gear shifting generation preset by a driver to simulate multi-speed gear shifting that the driver may sense when shifting in a vehicle having a multi-speed transmission, while driving an electric vehicle without the multi-speed transmission.

17 Claims, 18 Drawing Sheets

**CALCULATION OF LIMIT TORQUE FOR EACH
VIRTUAL GEAR SHIFT STAGE BY
REFLECTING GEAR RATIO INFORMATION**

———— VIRTUAL TARGET GEAR SHIFT ———— VIRTUAL ENGINE SPEED
———— LONGITUDINAL ACCELERATION SENSOR MEASUREMENTS
———— VIRTUAL CURRENT GEAR SHIFT ———— ACTUAL MOTOR SPEED
---------- LIMIT TORQUE FOR EACH VIRTUAL GEAR SHIFT STAGE
—-—-— VIRTUAL GEAR SHIFT PROGRESS

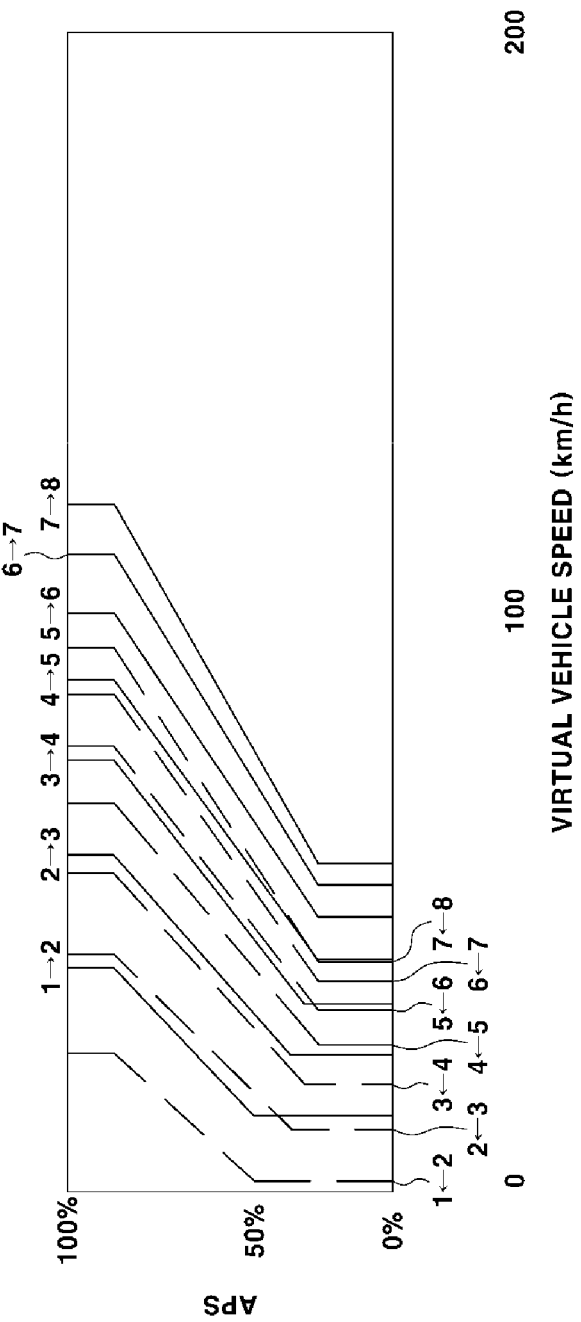
FIG. 15
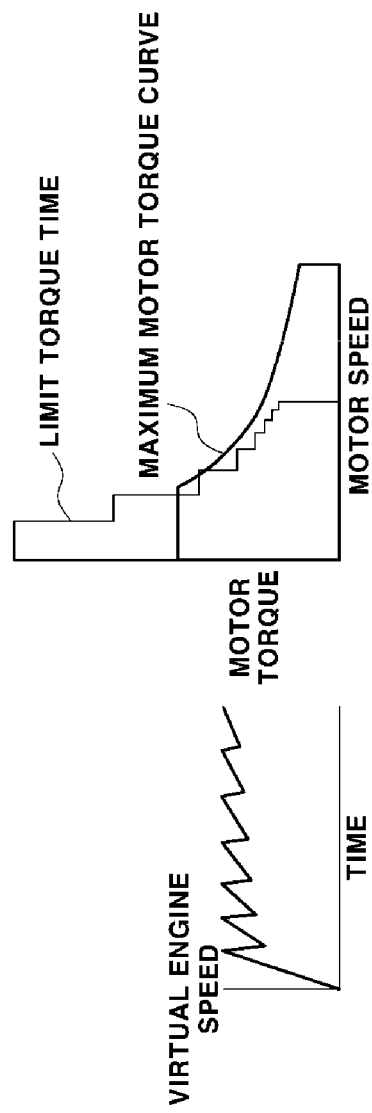

CONTROL METHOD FOR GENERATING VIRTUAL SENSATION OF GEAR SHIFTING OF ELECTRIC VEHICLE

CROSS REFERENCE TO RELATED APPLICATION

The present application claims priority to Korean Patent Application No. 10-2020-0070003, filed Jun. 10, 2020, the entire contents of which is incorporated herein for all purposes by this reference.

BACKGROUND OF THE INVENTION

Field of the Disclosure

The present disclosure relates to a control method of an electric vehicle and, more particularly, to a control method of an electric vehicle capable of generating and realizing a sensation of gear shifting being the same as that of a vehicle equipped with a multi-speed transmission, in an electric vehicle without a multi-speed transmission.

Description of the Related Art

As is well known, an electric vehicle (EV) is a vehicle that drives using a motor as a source of driving force for driving the vehicle. The powertrain of the electric vehicle includes: a battery that supplies electric power for driving a motor; an inverter connected to the battery to drive and operate the motor; a motor connected to the battery to be charged and discharged through the inverter as a driving source of a vehicle; and a reduction gear that decelerates rotational force of the motor and transmits the rotational force to driving wheels.

In particular, when driving the motor, the inverter converts direct current (DC) supplied from the battery into alternating current (AC) and applies the alternating current to the motor through a power cable, and when regenerating the motor, the inverter converts the alternating current generated by the motor operating as a generator into the direct current to supply to the battery, so that the inverter operates to charge the battery. In addition, unlike a conventional internal combustion engine vehicle, an ordinary electric vehicle does not use the multi-speed transmission, but the reduction gear using a fixed gear ratio is disposed between the motor and the driving wheel instead.

The reason is that the internal combustion engine has a wide distribution range of energy efficiency with respect to operating points and may only provide high torque in a high speed area, whereas, in the case of the motor, the difference in efficiency with respect to the operating points is relatively small, and low-speed, high-torque may be realized only with the motor's individual characteristics. There is clearly an advantage in that absence of a transmission provides smooth operability without the driving performance interruption due to gear shifting. However, for a driver who desires to have fun in driving, the absence of the transmission and a sensation of gear shifting may give a sense of boredom to the driver.

Accordingly, in the electric vehicle without the multi-speed transmission and equipped with the reduction gear, there is required the technology that allows a driver to experience driving sensibility, fun, excitement, and a sense of direct connection, which are provided by a vehicle equipped with the multi-speed transmission. Furthermore, when it is possible to offer a method of customizing a virtual sensation of gear shifting to a driver who values driving sensibility as important, a more differentiated feature for fun may be highlighted.

SUMMARY

Therefore, the present disclosure provides a control method of an electric vehicle capable of generating and realizing a sensation of gear shifting being the same as that of a vehicle equipped with a multi-speed transmission, in an electric vehicle without the multi-speed transmission.

In addition, the present disclosure provides a control method for generating a virtual sensation of gear shifting of the electric vehicle capable of freely changing and adjusting set values of variables (i.e., a number of pre-determined driver setting information) related to generation of the virtual sensation of gear shifting, so that a driver may be provided with the virtual sensation of gear shifting personally preferred by the driver.

In order to achieve the objective, according to an exemplary embodiment of the present disclosure, a control method of generating a virtual sensation of gear shifting of an electric vehicle may include: determining, by a controller, a basic torque command in real time based on vehicle driving information collected from a vehicle during driving of the electric vehicle; determining, by the controller, a virtual target gear shift stage based on the vehicle driving information collected from the vehicle and driver setting information input by a driver; determining, by the controller, a gear shift class from a virtual current gear shift stage and the determined virtual target gear shift stage and selecting a virtual gear shift intervention torque profile corresponding to the determined current gear shift class from among the virtual gear shift intervention torque profiles for each preset gear shift class; determining, by the controller, a virtual gear shift intervention torque for generating the virtual sensation of gear shifting in the real time according to the selected virtual gear shift intervention torque profile and generating a final motor torque command using the determined basic torque command, the virtual gear shift intervention torque, and the driver setting information input by the driver; and operating, by the controller, operation of a motor for driving the vehicle according to the generated final motor torque command.

Thus, according to the control method of the electric vehicle of the present disclosure, it may be possible to generate and realize the sensation of gear shifting the same as that of a vehicle equipped with the multi-speed transmission, in the electric vehicle without the multi-speed transmission. In addition, it may be possible to directly change and adjust variables related to the generation of the virtual sensation of gear shifting, so that drivers may be provided with the virtual sensation of gear shifting preferred by the drivers themselves. In other words, the driver may directly change and adjust values of the variables related to the generation of the virtual sensation of gear shifting, and be provided with the virtual sensation of gear shifting generated by the changed and adjusted variable values.

BRIEF DESCRIPTION OF THE DRAWINGS

The above and other objects, features and advantages of the present disclosure will be more clearly understood from the following detailed description taken in conjunction with the accompanying drawings, in which:

FIG. 15 is a view showing an example of short gear setting of the virtual final gear ratiorFg in the present disclosure.

DETAILED DESCRIPTION

Figure 1:
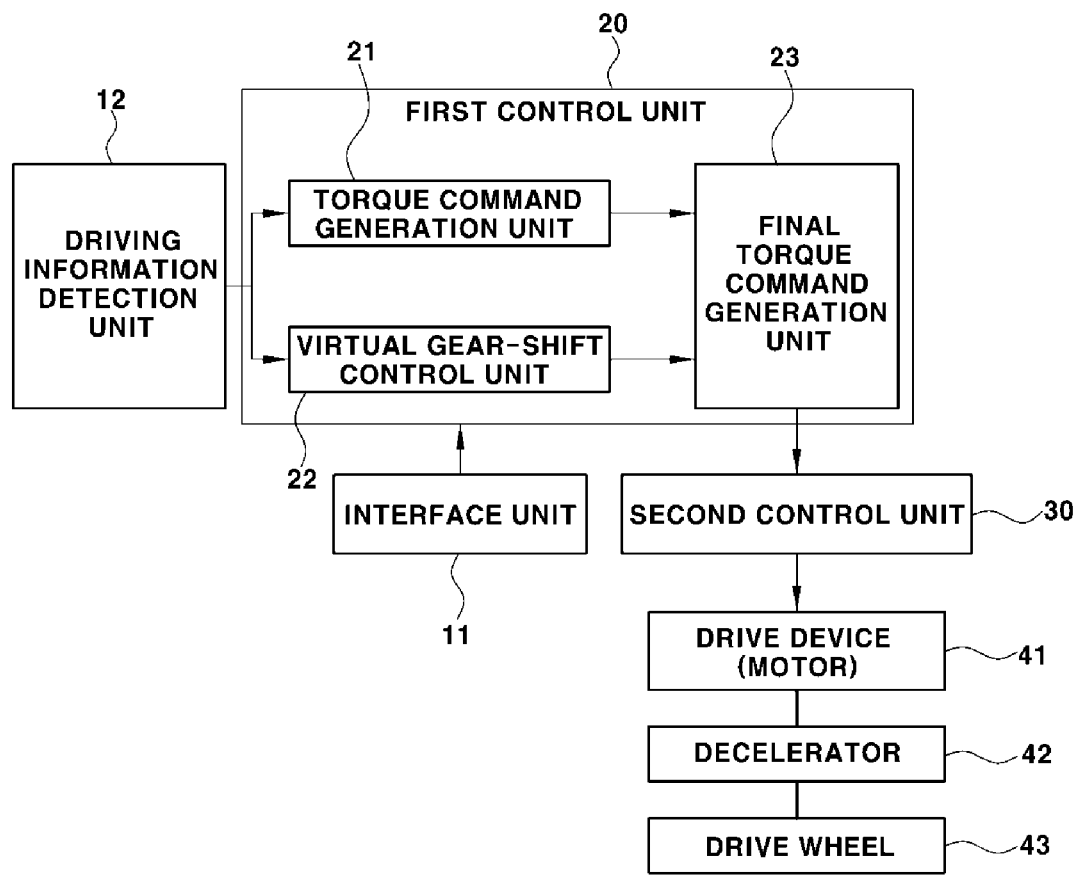
FIG. 1 is a block diagram showing a device configuration for controlling an electric vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying drawings so that those skilled in the art may easily implement the present disclosure. However, the present disclosure is not limited to the embodiment described herein and may be embodied in other forms.

The objective of the present disclosure is to provide a control method of an electric vehicle capable of generating and realizing a sensation of multi-speed gear shifting the same as that of a vehicle equipped with a multi-speed transmission, in the electric vehicle without the multi-speed transmission. In particular, another objective of the present disclosure is to provide a control method for generating the virtual sensation of gear shifting of an electric vehicle capable of freely changing and adjusting values of variables related to generation of a virtual sensation of gear shifting, so that a driver may be provided with the virtual sensation of gear shifting personally preferred by the driver.

In the following description, a motor means a driving motor that drives a vehicle, and in the present disclosure, the vehicle to be controlled may be an electric vehicle equipped with a reduction gear without an internal combustion engine (i.e., general engine) and a multi-speed transmission. As described above, in the case of a pure electric vehicle driven by a motor (i.e., motor-driven vehicle), unlike a conventional internal combustion engine vehicle, the pure electric vehicle does not use a multi-speed transmission, but a reduction gear using a fixed gear ratio is disposed between the motor and driving wheels instead.

However, in the absence of the multi-speed transmission, there is an advantage of smooth operability without interruption of driving performance at the time of gear shifting, but when a driver desires driving sensibility, fun, excitement, a sense of direct connection, and others which are provided by the multi-speed transmission, the driver may feel boredom while driving. Therefore, in the electric vehicle equipped with the reduction gear instead of the multi-speed transmission, there is required the technology that allows a driver to experience driving sensibility, fun, excitement, a sense of direct connection, and others which are provided by the multi-speed transmission.

As in the present disclosure, when a driver desires to experience driving sensibility, fun, excitement, a sense of direct connection, and others which only a transmission can provide, it may be possible to improve and differentiate the vehicle's commercial value when provided with a function to realize the virtual sensation of gear shifting to enable the driver to experience the desired sensations and fun in the same vehicle, without having to replace the vehicle.

In addition, in a conventional electric vehicle, it is not possible to control gear shift stages by a driver, and only a speed and accelerator pedal input maybe used to adjust the vehicle's behavior. However, when a function for the virtual sensation of gear shifting is realized in a vehicle capable of high-performance sport driving, it may be possible to facilitate management of cornering entry speed, load transfer, and others when driving.

Furthermore, when it is possible to offer a method of customizing a virtual sensation of gear shifting to a driver who values driving sensibility as important, a more differentiated feature for fun may be highlighted. In particular, the personalization of a sensation of gear shifting refers to the driver directly changing and adjusting set values of variables related to generation of a virtual sensation of gear shifting, to generate the virtual sensation of gear shifting corresponding to the changed set values.

Existing internal combustion engine vehicles have limitations in realizing the personalization of a powertrain due to reasons of fuel efficiency, exhaust gas regulation, etc. However, since there is no such exhaust gas regulation in electric vehicles and the effect of personalization of the drive system on fuel economy is relatively less than the effect on the fuel economy in an internal combustion engine vehicle, the vehicle quality from the perspective of emotion may be improved when it is possible to actively personalize the virtual sensation of gear shifting.

Therefore, there is a need for a method for realizing a virtual multi-speed gear shifting in the electric vehicle without the multi-speed transmission and a method to make personalization possible desired by a driver in realizing the virtual sensation of gear shifting in the powertrain of the electric vehicle through the virtual gear shift function which simulates the multi-speed gear shifting. Accordingly, a control method for a motor is disclosed in which a virtual gear shift model is established and a sensation of multi-speed gear shifting may be realized using the same. In addition, a control method is disclosed in which a driver may directly change set values of variables related to generating a virtual sensation of gear shifting.

The present disclosure is characterized in that virtual gear shift intervention torque and limit torque for each virtual gear shift stage may be determined from input variables through the virtual gear shift model that uses vehicle driving information collected from a vehicle during driving, as an input, and then the determined virtual shift intervention torque, the determined limit torque for each virtual shift stage, and motor torque command may be used to operate a motor, to realize the virtual multi-speed gear shifting.

In the present disclosure, the virtual gear shift function may include generating the virtual sensation of gear shifting according to the driver's driving input values and vehicle conditions based on values of variables related to the generating the virtual sensation of gear shifting preset by a driver, to simulate the multi-speed gear shifting that the driver may sense when gear shifting in a vehicle having a multi-speed transmission, while driving an electric vehicle without a multi-speed transmission.

In the present disclosure, the virtual sensation of gear shifting may be a simulation of vehicle behavior and movement that a driver may sense during a gear shift process of the multi-speed transmission, and in the present disclosure, the virtual sensation of gear shifting may be generated and realized through control of a driving motor. Particularly, the multi-speed transmission may be one of an automatic transmission (AT), a dual clutch transmission (DCT), and an automated manual transmission (AMT). In the present disclosure, the virtual sensation of gear shifting is provided by generating and simulating vehicle behavior and movement appearing during the gear shift process of a vehicle equipped with one of these transmissions through the control of the driving motor.

Figure 2:
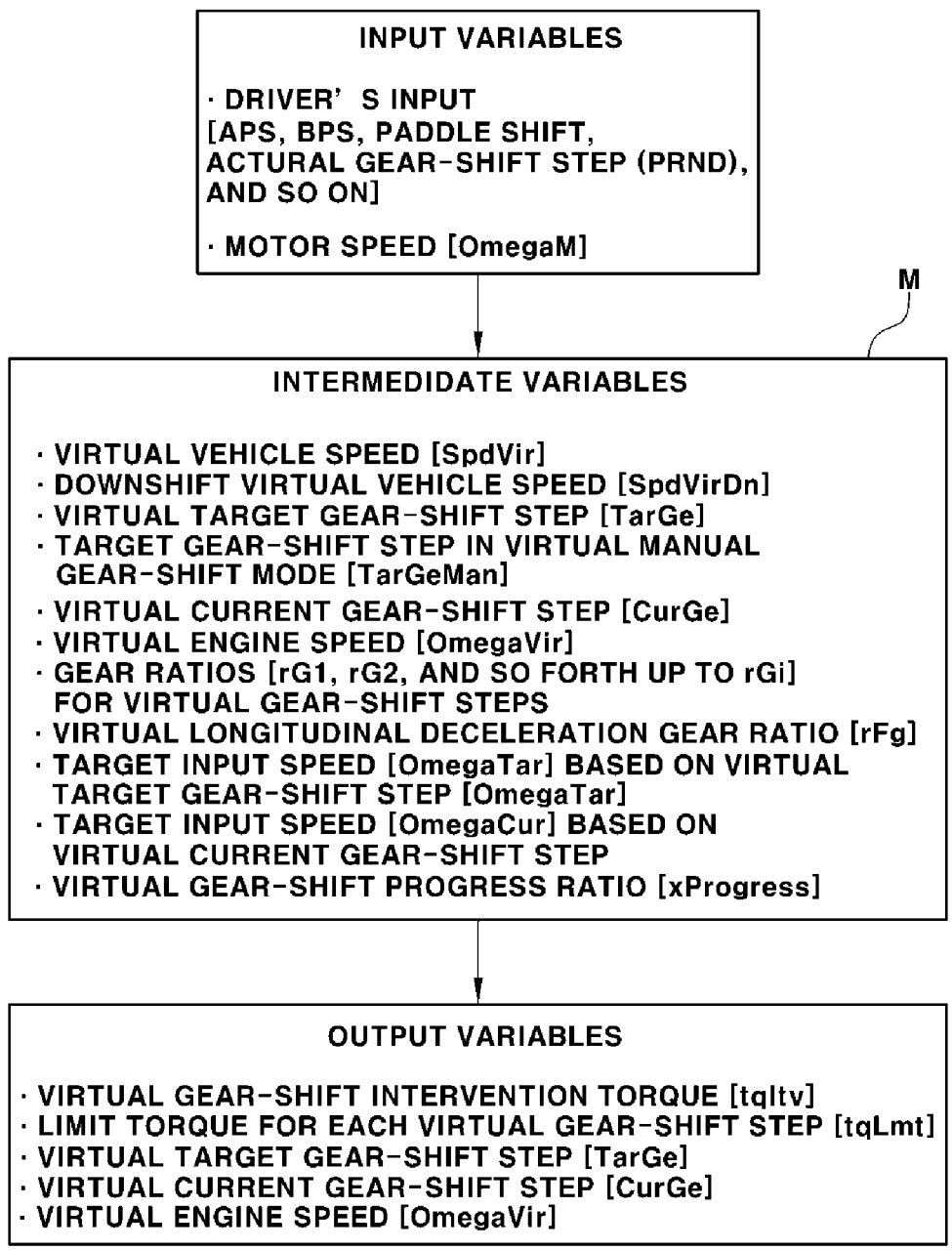
FIG. 2 is a block diagram showing input and output variables, and virtual gear shift intermediate variables of a virtual gear shift model for implementing a virtual gear shift function in the present disclosure.
Figure 3:
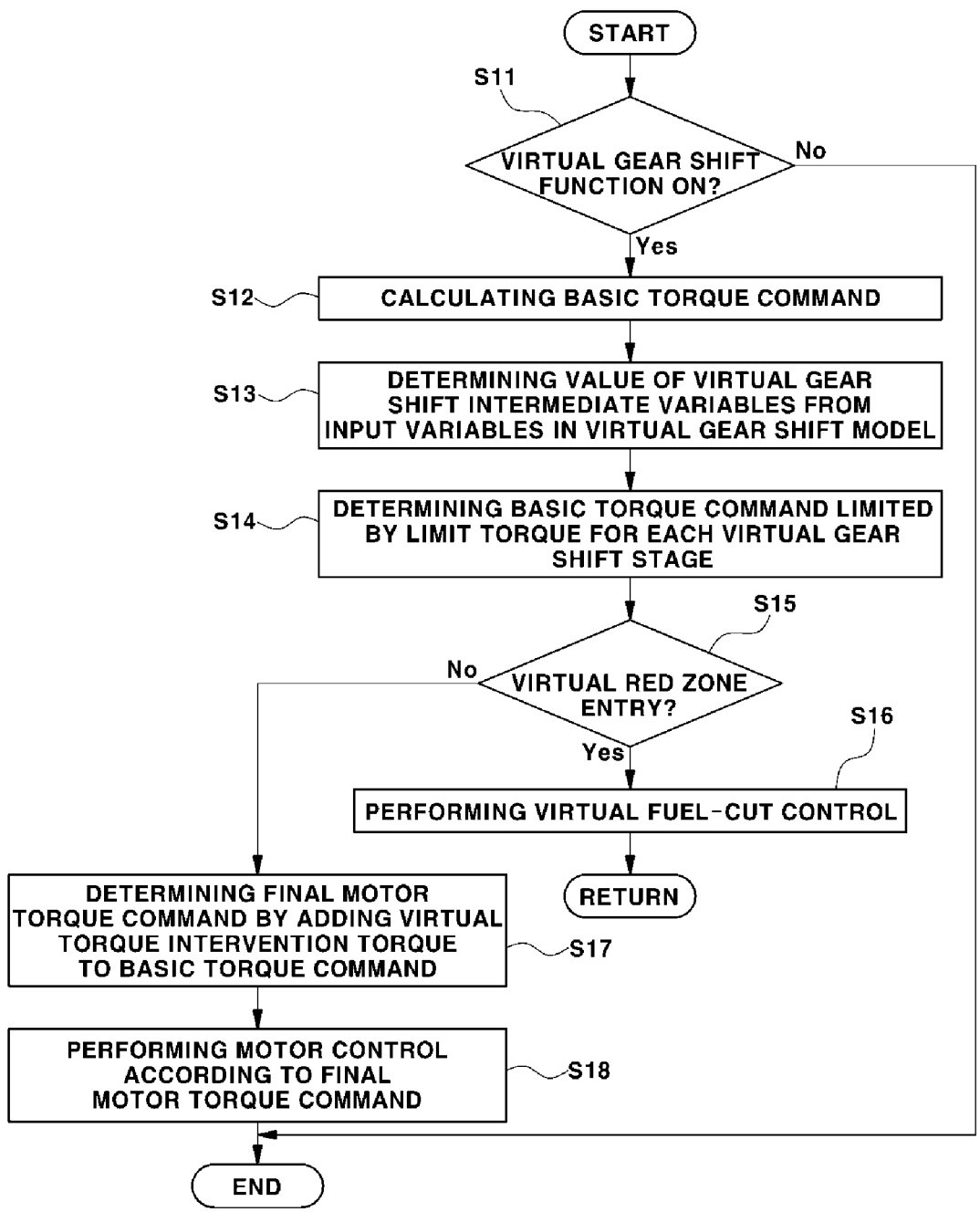
FIG. 3 is a flowchart showing a process for implementing the virtual gear shifting function in the present disclosure.

FIG. 1 is a block diagram showing a device configuration for controlling an electric vehicle according to the present disclosure, and FIG. 2 is a block diagram showing input and output variables, and virtual gear shift intermediate variables of a virtual gear shift model for implementing a virtual gear shift function in the present disclosure. In addition, FIG. 3 is a flowchart showing a process for implementing the virtual gear shift function in the present disclosure. The control method according to the present disclosure may include a virtual gear shift method for generating and realizing the virtual sensation of gear shifting that simulates the multi-speed gear shifting of a conventional multi-speed transmission vehicle through control or operation of the motor during vehicle driving.

Referring to FIG. 3, the control method according to the present disclosure may include: step S11, determining whether the virtual gear shift function is on; step S12, calculating a basic torque command in real time when the virtual gear shift function is on; step S13, determining a virtual gear shift intermediate variable value from an input variable in the virtual gear shift model; and step S14, determining the basic torque command limited by limit torque for each virtual gear shift stage (i.e., the limit torque of current gear shift stage).

In addition, the control method according to the present disclosure may further include: step S15, determining whether a virtual red zone has been entered from a virtual engine speed; step S16, performing virtual fuel-cut control when determined that the virtual red zone has been entered; step S17, determining a final motor torque command by adding virtual gear shift intervention torque to the basic torque command; and step S18, performing a motor control according to the final motor torque command.

Describing a device configuration for performing the above-described virtual gear shift process, as shown in FIG. 1, a device for control according to the present disclosure may include: an interface part 11 that allows a driver to select and input one of an on and an off of the virtual gear shift function of a vehicle and input predetermined driver setting information; a driving information detector 12 (e.g., sensors) configured to detect vehicle driving information; a first controller 20 configured to generate and output a torque command based on the vehicle driving information detected by the driving information detector 12 and the driver setting information input through the interface part 11; and a second controller 30 configured to operate a driving device 41 according to the torque command output from the first controller 20.

In the following description, the controller is divided into the first controller 20 and the second controller 30, but a plurality of controllers or a single integrated control element is collectively referred to as the controller, and it may also be understood that a control process is performed by the controller according to the present disclosure. As the interface part 11, any device may be used, as long as a driver to may the on and off of the virtual gear shift function in a vehicle and input predetermined driver setting information, and for example, an operating device such as a button and a switch provided in the vehicle and other input device or touch screen of AVN (Audio, Video, Navigation) systems, and others are applicable.

The interface part 11 may be connected to the first controller 20, and then, when an on or off operation is input by the driver and input operation of the driver setting information, an on and off operation signal and an input operation signal from the interface part 11 may be input to the first controller 20. Accordingly, the first controller 20 may be configured to recognize an on or off operation state of the virtual gear shift function by the driver and the input state of the driver setting information.

In the present disclosure, the virtual gear shift function for generating and realizing the virtual sensation of gear shifting during vehicle driving may be performed only in response to receiving the driver an on input of the virtual gear shift function through the interface part 11 (See step S11 in FIG. 3). In addition, when the above-described interface part 11 is a vehicle input device provided in a vehicle, although not shown in FIG. 1, instead of using the vehicle input device, the driver may perform on and off operation of the virtual gear shift function and input the driver setting information through a mobile device (not shown).

The mobile device must be communicatively connected to an in-vehicle device such as the first controller, and to this end, an input/output communication interface (not shown) for establishing communication between the mobile device and the first controller 20 may be utilized. The driving information detector 12 may be configured to detect vehicle driving information necessary to generate a motor torque command in a vehicle, where the vehicle driving information may include driving input information of the driver and vehicle status information.

In an exemplary embodiment of the present disclosure, the driving information detector 12 may include: an accelerator pedal detector configured to detect accelerator pedal input information according to a driver's accelerator pedal operation; and a brake pedal detector configured to detect brake pedal input information according to a driver's brake pedal operation. In addition, the driving information detector 12 may include: a paddle shift and shift lever detector; and a motor speed detector configured to detect a rotational speed (hereinafter referred to as "motor speed") of a motor that is the driving device 41 for driving a vehicle.

Particularly, the accelerator pedal detector may be an ordinary accelerator pedal sensor (i.e., accelerator position sensor, APS) installed on an accelerator pedal and configured to output an electrical signal based on the driver's accelerator pedal operation state. The brake pedal detector may be an ordinary brake pedal sensor (BPS) installed on a brake pedal and configured to output an electrical signal based on a driver's brake pedal operation state. In addition, the motor speed detector may be a known resolver installed in a motor (i.e., driving motor) 41.

At this time, the driver's driving input information may include an accelerator pedal input value (APS value) detected by the accelerator pedal detector and a brake pedal input value (BPS value) detected by the brake pedal detector. In addition, the driver's driving input information may further include: paddle shift input information according to the driver's paddle shift operation; and shift lever input information (i.e., information of P, R, N, and D gears) according to the driver's shift lever operation.

The shift lever input information may be detected by a shift lever detector, and the paddle shift input information may be received by the first controller 20 from the paddle shift. In addition, the vehicle status information may include a motor speed detected by the motor speed detector. The driving information used to generate the basic torque command in a torque command generator 21 may further include a vehicle speed as vehicle status information, and in this case, the driving information detector 12 is not shown in FIG. 1, but a vehicle speed detector configured to detect current driving vehicle speed may be further included, and the vehicle speed detector may be configured to include a wheel speed sensor installed in a driving wheel of a vehicle.

In addition, the first controller 20 may include: a torque command generator 21 configured to generate a basic torque command from vehicle driving information; a virtual gear shift controller 22 configured to generate a correction torque command (i.e., a virtual gear shift intervention torque command for realizing the virtual sensation of gear shifting) for generating and realizing the virtual sensation of gear shifting from the vehicle driving information according to the driver setting information; and a final torque command generator 23 configured to correct the basic torque command with the correction torque command to generate a corrected final torque command.

The basic torque command may be a motor torque command determined and generated based on driving information collected during driving in an ordinary electric vehicle (step S12), and the torque command generator 21 may be a vehicle controller (VCU) configured to generate the motor torque command based on the driving information in the ordinary electric vehicle, or a part of the vehicle controller. In addition, in the present disclosure, the virtual gear shift controller 22 is a novel component configured to determine, generate, and output a virtual gear shift intervention torque command, which is a correction torque command for realizing only the virtual sensation of gear shifting apart from the basic torque command, and may be added as a part of the vehicle controller therein or may be provided as a separate control component apart from the vehicle controller.

In the final torque command generator 23, the basic torque command input from the torque command generator 21 may be corrected by the correction torque command input from the virtual gear shift controller 22, but the final torque command may be calculated by adding the virtual gear shift intervention torque command which is the correction torque command to the basic torque command. The second controller 30 is a controller configured to receive the torque command, transmitted from the first controller 20, that is, the final torque command determined by the final torque command generator 23 of the first controller 20 to operate the driving device 41. In the present disclosure, the driving device 41 is a motor (i.e., driving motor) that drives a vehicle, and the second controller 30 is a known motor controller (i.e., motor control unit, MCU) configured to operate the motor using an inverter in an ordinary electric vehicle and operate the motor.

Meanwhile, in the present disclosure, the virtual gear shift model for determining and outputting a virtual gear shift intervention torque command using the vehicle driving information collected from a vehicle as an input may beset and input to the virtual gear shift controller 22. In the present disclosure, the input variable of the virtual gear shift model becomes the vehicle driving information detected by the driving information detector 12, and the vehicle driving information includes driving input information of a driver and vehicle status information as described above.

In particular, the driver's driving input information may include accelerator pedal input information (i.e., information of APS value), brake pedal input information (i.e., information of BPS value), paddle shift input information, and shift lever input information (i.e., information of P, R, N, and D gears). In addition, the vehicle status information may include the motor speed. In the virtual gear shift controller 22, values of intermediate variables may be calculated from a model input variable by the virtual gear shift model, and further, from the values of these intermediate variables, a torque command for generating and realizing the virtual sensation of gear shifting, and a limit torque for each virtual gear shift stage reflecting gear ratio information are determined and output (See step S13). In particular, the torque command for generating and realizing the virtual sensation of gear shifting becomes not only the virtual gear shift intervention torque command but also the correction torque command for correcting the basic torque command.

Referring to FIG. 2, as vehicle driving information, the input variable of the virtual gear shift model M may include: accelerator pedal input information (information of APS value); brake pedal input information (information of BPS value); paddle shift input information; shift lever input information (information of P, R, N, and D gears); and motor speed OmegaM information. In addition, in FIG. 2, intermediate variables used to perform a virtual gear shift function in the virtual gear shift model M, that is, model intermediate variables for generating the virtual sensation of gear shifting obtained from input variables in the virtual gear shift model are illustrated.

In the exemplary embodiment of the present disclosure, the intermediate variable obtained from the input variable may include a virtual speed SpdVir, a virtual speed for downshifting SpdVirDn, a virtual target gear shift stage TarGe, a virtual manual gear shift mode target gear shift stage TarGeMan, a virtual current gear shift stage CurGe, a virtual engine speed OmegaVir, a gear ratio for each virtual gear shift stage rG1, rG2, . . . , rGi, a virtual final gear ratiorFg, a target input speed based on virtual target gear shift stage OmegaTar, a target input speed based on virtual current gear shift stage OmegaCur, and a virtual gear shift progress rate xProgress.

In particular, when it is assumed that a virtual transmission and a virtual engine exist in a vehicle, the "input speed" refers to the virtual engine speed that becomes the input speed of the virtual transmission. Accordingly, the "target input speed based on virtual target gearshift stage" refers to the virtual engine speed of virtual target gear shift stage, and the "target input speed based on virtual current gear shift stage" refers to the virtual engine speed of virtual current gear shift stage. In the present disclosure, the intermediate variable for virtual gear shift is not related to a physical value of a real hardware of a vehicle, and is used only to realize the virtual sensation of gear shifting.

In the present disclosure, the physical variables used as actual measurements or interventions in the powertrain of the electric vehicle may be referred to the above input variables (APS value, BPS value, paddle shift input value, and shift lever input value), the motor speed OmegaM, the virtual gear shift intervention torque tqltv, and the limit torque for each virtual gear shift stage tqLmt. In addition, in the exemplary embodiment of the present disclosure, the output variable of the virtual gear shift model M may include a virtual gear shift intervention torque command (i.e., correction torque command) tqltv for providing and realizing the virtual sensation of gear shifting.

In addition, the output variable of the virtual gear shift model M may further include limit torque for each virtual gear shift stage tqLmt. In addition, in the exemplary embodiment of the present disclosure, the output variables of the virtual gear shift model M may further include at least some of the virtual gear shift intermediate variables, and for example, the virtual target gear shift stage TarGe, the virtual current gear shift stage CurGe, and the virtual engine speed OmegaVir among the virtual gear shift intermediate variables may be further included.

The virtual target gear shift stage TarGe, the virtual current gear shift stage CurGe, and the virtual engine speed OmegaVir, which are output from the virtual gear shift model M, may be transmitted to a cluster controller (not shown) and may become cluster display information displayed on a cluster (not shown). The virtual gear shift intervention torque command and the limit torque for each virtual gear shift stage (which is the limit torque of current gear shift stage) output from the virtual gear shift controller 22 are input to the final torque command generator 23, and then, the final torque command generator 23 may be used to generate the final torque command from the basic torque command.

In other words, in the final torque command generator 23, when necessary, the basic torque command may be limited to the limit torque for each virtual gear shift stage (step S14), wherein, when the basic torque command is less than the limit torque, the basic torque command may be used as it is, whereas, when the basic torque command is greater than the limit torque, the basic torque command may be limited to the limit torque value. Accordingly, the basic torque command limited to the value within the limit torque for each virtual gear shift stage in the final torque command generator 23 may then be summed with the virtual gear shift intervention torque command, and the summed torque command becomes the final motor torque command (step S17).

When the basic torque command is greater than or equal to the limit torque, the final motor torque command may be determined by the sum of the limit torque value and the virtual gear shift intervention torque command. In this regard, the final motor torque command calculated in the final torque command generator 23 may be transmitted to the second controller 30, and the second controller 30 may be configured to operate the motor according to the final motor torque command (step S18).

Hereinafter, the virtual gear shift intermediate variables in the virtual gear shift model M in the virtual gear shift controller 22 will be described in more detail. First, in the virtual gear shift model M of the virtual gear shift controller 22, the virtual vehicle speed SpdVir is generated as an input of a gear shift schedule map, and this virtual vehicle speed SpdVir is used as a reference vehicle speed in the virtual gear shift function. The virtual vehicle speed SpdVir may be calculated as a value directly proportional to the actual motor speed OmegaM by using the actual motor speed OmegaM and the virtual final gear ratiorFg, which are some of the model input variables.

In the example of FIG. 2, the virtual final gear ratio is shown as included in the virtual gear shift intermediate variable. However, in the exemplary embodiment of the present disclosure, the virtual final gear ratiorFg may be predetermined by a driver as one of driver setting information. In addition, in the virtual gear shift model, a virtual vehicle speed for downshifting SpdVirDn is generated, and this is a variable used as an input of a gear shift schedule map during downshift, thereby being calculated by applying a preset scale factor and an offset value to the virtual vehicle speed SpdVir.

However, when the gear shift schedule maps for upshifting and downshifting are separately provided and used, there is no problem to use only the virtual vehicle speed SpdVir that is the reference speed. When using a single gear shift schedule map without distinction between upshifting and downshifting, a virtual vehicle speed for downshift SpdVirDn is further used in addition to the virtual vehicle speed SpdVir that is the reference vehicle speed to add a hysteresis effect between upshift and downshift. To realize a common hysteresis effect in the present disclosure, after the virtual vehicle speed SpdVir is multiplied by a scale factor greater than 1, the virtual vehicle speed for downshift SpdVirDn may be determined as a value obtained by adding a positive offset value to the above multiplied value.

Figure 4:
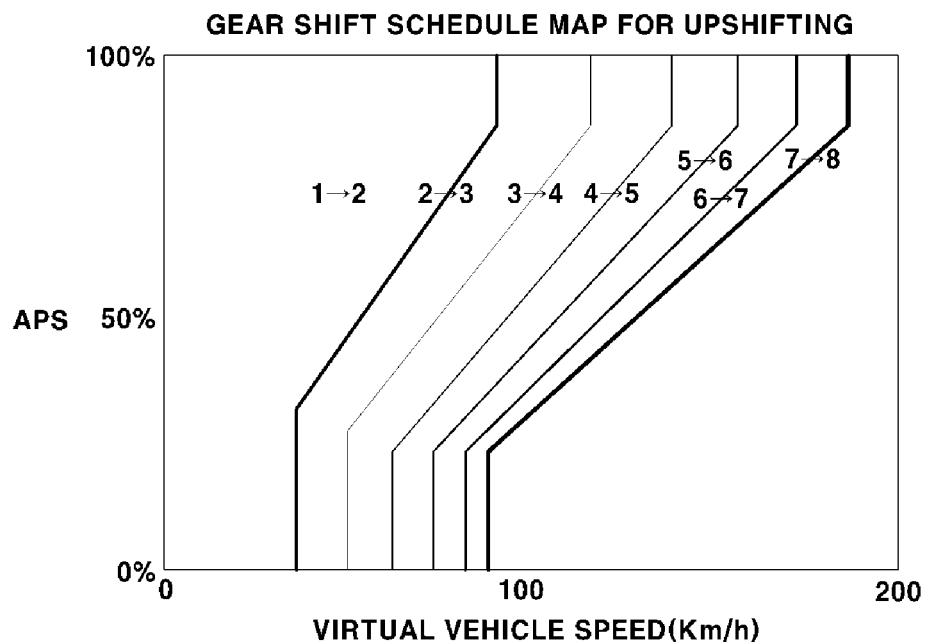
FIG. 4 is a view showing a gear shift schedule map for determining a virtual target gear shift stage in the present disclosure.
Figure 4:
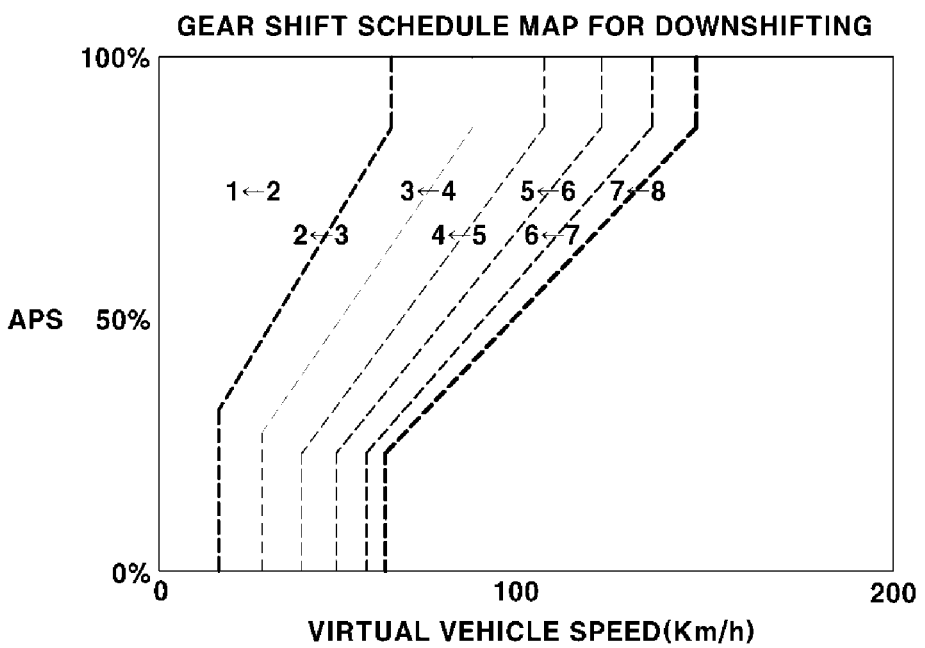

FIG. 4 is a view showing a gear shift schedule map for determining a virtual target gear shift stage TarGe in the present disclosure, and illustrating the gear shift schedule map for upshifting and the gear shift schedule map for downshifting, which are provided respectively. In each gear shift schedule map shown, the horizontal axis represents the vehicle speed (km/h), and the vertical axis represents the accelerator pedal input value (APS value), and at this time, the vehicle speed of the horizontal axis is the virtual vehicle speed SpdVir that is the reference vehicle speed.

As described above, the gear shift schedule map uses a virtual vehicle speed SpdVir and an accelerator pedal input value (APS value) indicating the driver's intent, and the virtual target gear shift stage TarGe corresponding to the virtual vehicle speed SpdVir and the accelerator pedal input value (APS value) is determined from the gear shift schedule map. As shown in FIG. 4, when the gear shift schedule map for upshifting and the gear shift schedule map for downshifting are separately provided, a virtual vehicle speed is used as a vehicle speed for determining a virtual target gear shift stage TarGe, and at this time, the virtual vehicle speed is the virtual vehicle speed SpdVir that is the reference speed obtained from the actual motor speed OmegaM and the virtual final gear ratiorFg, as described above.

As described above, when the gear shift schedule maps for upshifting and downshifting are used separately, the virtual target gear shift stage TarGe is determined from the virtual vehicle speed SpdVir that is the reference vehicle speed and the accelerator pedal input value (APS value). However, when a single gear shift schedule map is used for upshifting and downshifting, a virtual target gear shift stage TarGe is determined using a virtual vehicle speed SpdVir for downshifting separately from the virtual vehicle speed SpdVir that is the reference vehicle speed.

Figure 5:
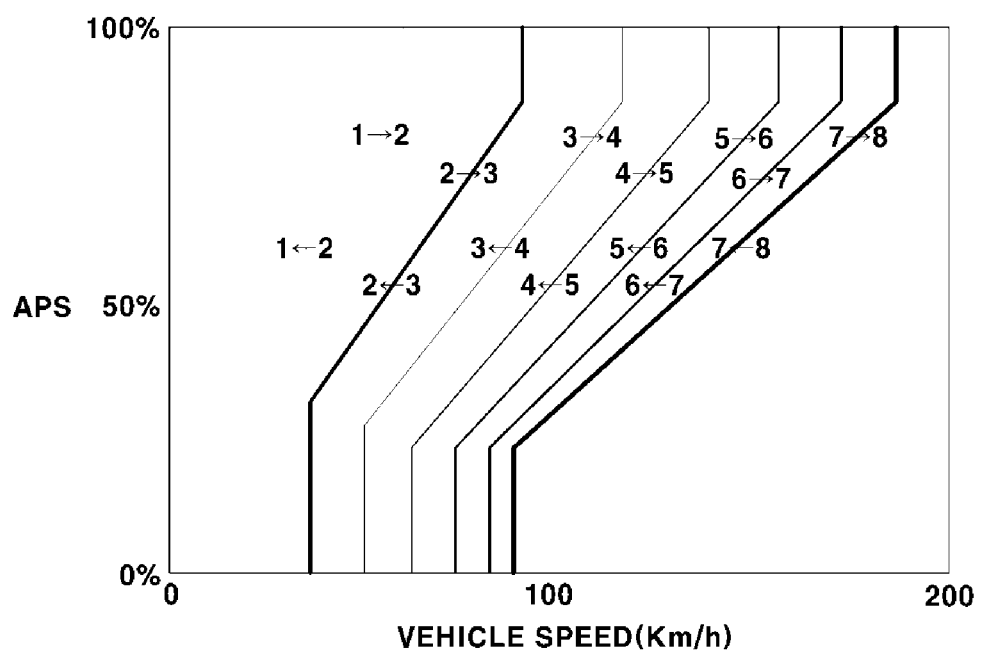
FIG. 5 is a view showing the gear shift schedule map that may be used for both upshifting and downshifting in the present disclosure.

FIG. 5 is a view showing the gear shift schedule map that may be used for both upshifting and downshifting in the present disclosure. When the single gear shift schedule map shown in FIG. 5 is used for both upshifting and downshifting, in the case of the upshifting, the virtual vehicle speed SpdVir that is the reference vehicle speed (becoming a virtual vehicle speed for upshifting) is used, and in the case of the downshifting, the virtual vehicle speed for downshifting SpdVirDn is used to determine the virtual target gear shift stage TarGe in the gear shift schedule map.

In other words, by using one gear shift schedule map, when upshifting, the virtual target gear shift stage TarGe is determined from the virtual vehicle speed SpdVir that is the reference vehicle speed and the accelerator pedal input value (APS value), and when downshifting, the virtual target gear shift stage TarGe is determined from the virtual vehicle speed for downshifting SpdVirDn and the accelerator pedal input value (APS value). In other words, in the gear shift schedule map of FIG. 5, when the vehicle is upshifted, the vehicle speed of the horizontal axis is the virtual vehicle speed SpdVir that is the reference speed, and when the vehicle is downshifted, the vehicle speed of the horizontal axis is the virtual vehicle speed SpdVirDn for downshifting.

In the above description, although the vertical axes of FIGS. 4 and 5 are described as the accelerator pedal input value, that is, the APS value (%), other vehicle load values may be the vertical axis values of the gear shift schedule map instead of the accelerator pedal input values. In other words, the vertical axis of the gear shift schedule map may be a brake pedal input value (BPS value) or a basic torque command instead of the accelerator pedal input value.

Along with this virtual vehicle speed, there may be an input variable of a gear shift schedule map for determining a virtual target gear shift stage. When the virtual vehicle speed SpdVir that is the reference vehicle speed is a virtual vehicle speed for upshifting, the virtual vehicle speed for downshifting SpdVirDn may be determined by a value added the offset value $\beta$ after multiplying the virtual vehicle speed SpdVir for upshifting by a scale factor $\alpha$, as shown in Equation 1 below.

$$SpdVir = SpdVirDn \times \alpha + \beta \quad (1)$$

Next in the virtual gear shift model M of the virtual gear shift controller 22, whether to enter the manual gear shift mode may be determined, but when there is operation of the gear shift lever or input of the paddle shift, it may be determined that a manual gear shift mode that performs gear shifting according to the driver's intent is operated, whereas a general automatic gear shift in which gear shifting is automatically performed according to a preset gear shifting schedule is operated.

Since the target gear shift stage according to the driver's intent may be different from the target gear shift stage of when gear shifting automatically, in response to determining that the manual gear shift mode is operated, the target gear shift stage in the manual gear shift mode, that is, the virtual manual gear shift mode target gear shift stage TarGeMan may be determined in the virtual gear shift model M of the virtual gear shift controller 22. The virtual manual gear shift mode target gear shift stage TarGeMan may be determined by the driver's gear shift lever input information or paddle shift input information.

In addition, the final target gear shift stage in the virtual gear shift function may be calculated from the virtual gear shift model M of the virtual gear shift controller 22. As described above, fundamentally, in the automatic gear shift mode, the target gear shift stage determined by the gear shift schedule map may be determined as a virtual target gear shift stage TarGe, but in the manual gear shift mode, the virtual manual gear shift mode target gear shift stage TarGeMan determined by the driver's gear shift lever input or paddle shift input may be determined as the virtual target gear shift stage TarGe.

Explaining how to determine the target gear shift stage by the gear shift schedule map in the automatic gear shift mode (i.e., when not in the manual gear shift mode), as described above, the gear shift schedule map is used, which has input of load values such as virtual vehicle speed (km/h), accelerator pedal input value (APS value), etc. In particular, the gear shift schedule map is a map in which virtual target gear shift stages are set in advance, the virtual target gear shift stages corresponding to each combination as an input of vehicle load value information including virtual vehicle speed, accelerator pedal input values, etc., and as for the vehicle load value information, a brake pedal input value (BPS value) or a basic torque command, etc. may be used in addition to the accelerator pedal input value (APS value) that is the driving input information of a driver.

As for the reference speed used as the input of the gear shift schedule map, as described above, the virtual vehicle speed SpdVir determined by the virtual final gear ratiorFg and the actual motor speed OmegaM may be used, or a virtual vehicle speed for downshifting SpdVirDn determined from the virtual vehicle speed may be used. In determining the target gear shift stage as described above, at a current time point, there are two target gear shift stages, that is, the two target gear shift stages respectively determined by the virtual vehicle speed SpdVir that is the reference speed and the virtual vehicle speed for downshifting SpdVirDn.

At this time, the final target gear shift stage may be determined using two values, wherein, as a method thereof, it is determined as a valid value only when the value of the target gear shift stage determined by the virtual vehicle speed SpdVir has increased from the value in the previous step (e.g., from the first gear shift stage to the second gear shift stage), to determine the target gear shift stage determined by the virtual vehicle speed SpdVir and update it as the final virtual target gear shift stage TarGe.

In the same manner, it may be determined as a valid value only when the value of the target gear shift stage determined by the virtual vehicle speed for downshifting SpdVirDn has decreased from the value in the previous step (e.g., from the second gear shift stage to the first gear shift stage), so that the target gear shift stage determined by the virtual vehicle speed for downshifting SpdVirDn may be determined and updated as the final virtual target gear shift stage TarGe. However, the final determined virtual target gear shift stage TarGe should be calculated as a value within a range of selectable lowest and highest gear shift stages.

Meanwhile, in the virtual gear shift model of the virtual gear shift controller 22, a delayed target gear shift stage having a delayed value by a predetermined delay time may be determined from the virtual target gear shift stage TarGe, wherein the delay time uses a preset time, meaning the time in which gear shifting will be operated changing to the target gear shift stage, but the gear shift of the virtual engine speed OmegaVir has not yet started. This is the time referring to a state before starting of the inertia phase on the actual transmission. In addition, the virtual gear shift model M of the virtual gear shift controller 22 detects a change in the target gear shift stage TarGeto calculate the virtual gear shift progress rate xProgress.

Particularly, the change of the target gear shift stage indicates that a new virtual target gear shift stage different from the current gear shift stage is determined from the gear shift schedule map or paddle shift input or shift lever input information in the manual gear shift mode. Counting starts at time 0 at a time when the target gear shift stage is changed (that is, a time when the new virtual target gear shift stage is determined), and the gear shift progress rate xProgress may be determined as a percentage of the counted time with respect to the total preset gear shift time, wherein this gear shift progress rate xProgress increases up to 100%.

The time point at which the target gear shift stage is changed refers to a time point at which the new virtual target gear shift stage is determined by the gear shift schedule map in the virtual current gear shift stage that is the previous target gear shift stage. As described above, the counting may be started by setting a time point at which the target gear shift stage is changed to time 0, but it is possible to alternatively apply the count start time to be a changed time point of the delayed target gear shift stage.

In other words, when the changed virtual target gear shift stage is determined, the controller may be configured to count time from the time when the delay time has elapsed after the virtual target gear shift stage is determined, and determine the virtual gear shift progress rate in the same manner using the counted time. Alternatively, as another method, during the gear shifting process, a value of the current virtual engine speed may be expressed as a percentage indicating where the value thereof obtained in real time is positioned between a target input speed based on virtual current gear shift stage (i.e., virtual engine speed of the virtual current gear shift stage) OmegaCur and a target input speed based on virtual target gear shift stage (i.e., virtual engine speed of the virtual target gear shift stage) OmegaTar.

At the time when the virtual target gear shift stage is determined, the virtual gear shift progress rate may be determined as a percentage value of the speed difference between the virtual engine speed OmegaVir in real time and the target input speed based on virtual current gear shift stage OmegaCur during the gear shift process, with respect to the speed difference between the target input speed based on virtual target gear shift stage OmegaTar and the target input speed based on virtual current gear shift stage OmegaCur during the gear shifting process. In addition, in the virtual gear shift model M of the virtual gear shift controller 22, the virtual engine speed OmegaCur may be determined using information of the virtual vehicle speed SpdVir that is fundamentally the reference speed and the virtual gear ratio rGi of the virtual current gear shift stage.

The virtual engine speed OmegaCur may be obtained from the product of the virtual vehicle speed SpdVir and the virtual gear ratio rGi of the virtual current gear shift stage, or the virtual engine speed OmegaCur may be obtained from the product of the powertrain speed such as the motor speed and the virtual gear ratio rGi of the virtual current gear shift stage. In addition, during the gear shifting process from the time when the target gear shift stage changes, that is, when gear shifting starts, the virtual engine speed OmegaVir may be determined based on information of a target input speed based on virtual current gear shift stage (i.e., the virtual engine speed of the virtual current gear shift stage) OmegaCur and a target input speed based on virtual target gear shift stage (i.e., the virtual engine speed of the virtual target gear shift stage) OmegaTar.

In particular, the target input speed based on virtual current gear shift stage OmegaCur may be obtained using the virtual vehicle speed SpdVir and the virtual gear ratio rGi of the virtual current gear shift stage CurGe at the time when the target gear shift stage is changed. In addition, the target input speed based on virtual target gear shift stage OmegaTar may be obtained using the virtual vehicle speed SpdVir and the virtual gear ratio rGi of the virtual target gear shift stage TarGe when the target gear shift stage is changed. Subsequently, in the process of gear shifting, the virtual engine speed OmegaVir may be obtained by applying a preset rate limit to the target input speed based on virtual current gear shift stage.

In the present disclosure, the current virtual engine speed OmegaVir during the gear shifting process may be obtained from the virtual vehicle speed in real time, but may be determined as a value that changes while maintaining a preset rate limit (i.e., change rate limit value) from the virtual speed based on current gear shift stage (i.e., the target input speed based on the virtual current gear shift stage) up to the virtual speed based on the target gear shift stage (i.e., the target input speed based on virtual target gear shift stage).

In addition, as the gear shifting progresses to some extent, the virtual engine speed OmegaVir set to a target input speed based on virtual current gear shift stage (i.e., the virtual engine speed of the virtual current gear shift stage) OmegaCur may be replaced by a target input speed based on virtual target gear shift stage (i.e., the virtual engine speed of the virtual target gear shift stage) OmegaTar. As an alternative method, the virtual engine speed OmegaVir may be obtained by way of multiplying the virtual gear ratio rGi corresponding to the previously calculated delayed target gear shift stage by the virtual vehicle speed SpdVir that is the reference vehicle speed, and by taking its rate limit value.

Meanwhile, in the virtual gear shift model M of the virtual gear shift controller 22, the virtual current gear shift stage CurGe fundamentally indicates the current gear shift stage of the previous time step, that is, the current gear shift stage before the gear shift start, until the current gear shift completion condition is satisfied. In other words, the current gear shift stage value may be maintained until the gear shift completion condition is satisfied, and the virtual target gear shift stage determined by the gear shift schedule map may be maintained as the targeted gear shift stage after gear shifting from the state of before the gear shift is completed.

However, when the gear shift completion condition is satisfied after the start of gear shift, the virtual target gear shift stage TarGe before satisfaction is updated to the virtual current gear shift stage CurGe, and the previous target gear shift stage becomes the current gear shift stage from a time point of satisfaction of the gear shift completion condition. At this time, the gear shift completion condition may include one or more of the following conditions.

1) The condition that the virtual gear shift progress rate xProgress value is 100%
2) The condition that the virtual gear shift progress rate xProgress value is reset to 0%
3) The condition that the virtual gear shift progress rate xProgress value is more than a certain value
4) The condition that the difference between the virtual engine speed OmegaVir and the virtual engine speed of the virtual target gear shift stage (i.e., the target input speed based on virtual target gear shift stage) OmegaTar is below a certain value
5) The condition where the value obtained by multiplying the virtual gear ratio rGi corresponding to the delayed target gear shift stage by the virtual vehicle speed SpdVir that is the reference vehicle speed is equal to the virtual engine speed OmegaVir obtained by taking a rate limit value to the multiplied value, or the difference between the two values is equal to a certain value, or is less than or equal to a certain value.

When describing "the condition that the virtual gear shift progress rate xProgress value is reset to 0%", in the case where a control logic is programmed to be reset to 0% immediately after the status based on a status that the virtual gear shift progress rate reaches 100%, it may be determined that the time point when reset to 0% as described above is the time point at which the gear shift is completed That is, the gear shift progress rate will remain at 0% until a gear shifting event starts again, but it may be possible to determine that the time point when the gear shift progress rate firstly reaches 0% is determined as the time when the gear shifting is completed.

As described above, the completion of gear shifting may be determined based on the virtual gear shift progress rate xProgress, but may also be determined based on the virtual engine speed. Even though the virtual engine speed converges so that the difference value is less than or equal to the virtual engine speed of the virtual target gear shift stage, it may be determined that the gear shift completion condition is satisfied.

Next in a vehicle having a real transmission, the torque multiplication effect between the front and rear of the transmission decreases due to the reduction in gear ratio as gear upshifting occurs, and eventually, even though the engine generates the same torque, the final acceleration may be reduced. In order to mimic this effect, the present disclosure may calculate the limit torque for each virtual gear shift stage tqLmt and use the limit torque to limit the torque command. At this time, in the virtual gear shift model of the virtual gear shift controller 22, the limit torque for each virtual gear shift stage tqLmt (which is the limit torque of the current gear shift stage) may be calculated by multiplying all of the virtual gear ratio rGi corresponding to the virtual current gear shift stage CurGe, the virtual final gear ratiorFg, and the limit torque setting parameters.

In addition, the limit torque for each virtual gear shift stage tqLmt may be dualized and set in the driving direction and the regenerative direction of the motor, which may be implemented by dualization of the limit torque setting parameter. To adjust motor torque by applying such limit torque, the motor torque in the driving direction may be limited to a limit torque tqLmt value for the driving direction, and the motor torque in the regenerative direction may be limited to a limit torque tqLmt value for the regenerative direction.

In yet another method, after calculating the basic torque command by generating and adding three types of motor torque commands: regenerating, coasting, and driving, the torque command may be limited to the limit torque tqLmt value for the driving direction when driving, and may be limited to the limit torque tqLmt value for the regenerative direction during coasting and regenerating where the vehicle is driven in a coast-down mode. Undoubtedly, the regenerative torque command and the coast torque command may be 0 when driving, and the driving torque command may be 0 when regenerating or coasting.

For the purpose of simulating gear ratio effect for each gear shift stage applied proportionally as well as limiting the maximum magnitude of torque, when determining the value between the accelerator pedal input value (APS value) and the driving torque, the ratio of applying the accelerator pedal input value to the limit torque tqLmt value for the current driving direction may be used, rather than the ratio of the accelerator pedal input value (APS value) to the maximum motor torque.

In addition to the method of determining the torque command by the ratio of the simple accelerator pedal input value (APS value) of the limit torque for each virtual gear shift stage tqLmt, it may also be possible to determine the torque command by a torque ratio which is a function of the preset accelerator pedal input value of the limit torque tqLmt. For example, it may be possible to determine the basic torque command as the torque of 20%, 50%, and 80% of the limit torque tqLmt when the accelerator pedal input values are 20%, 50%, and 80%, respectively, but when the APS value is 20%, 50%, and 80%, and the torque ratio value mapped to each APS value is 40%, 70%, and 85%, the basic torque command may be determined with torques of 40%, 70%, and 85% of the limit torque tqLmt, respectively.

Figure 6:
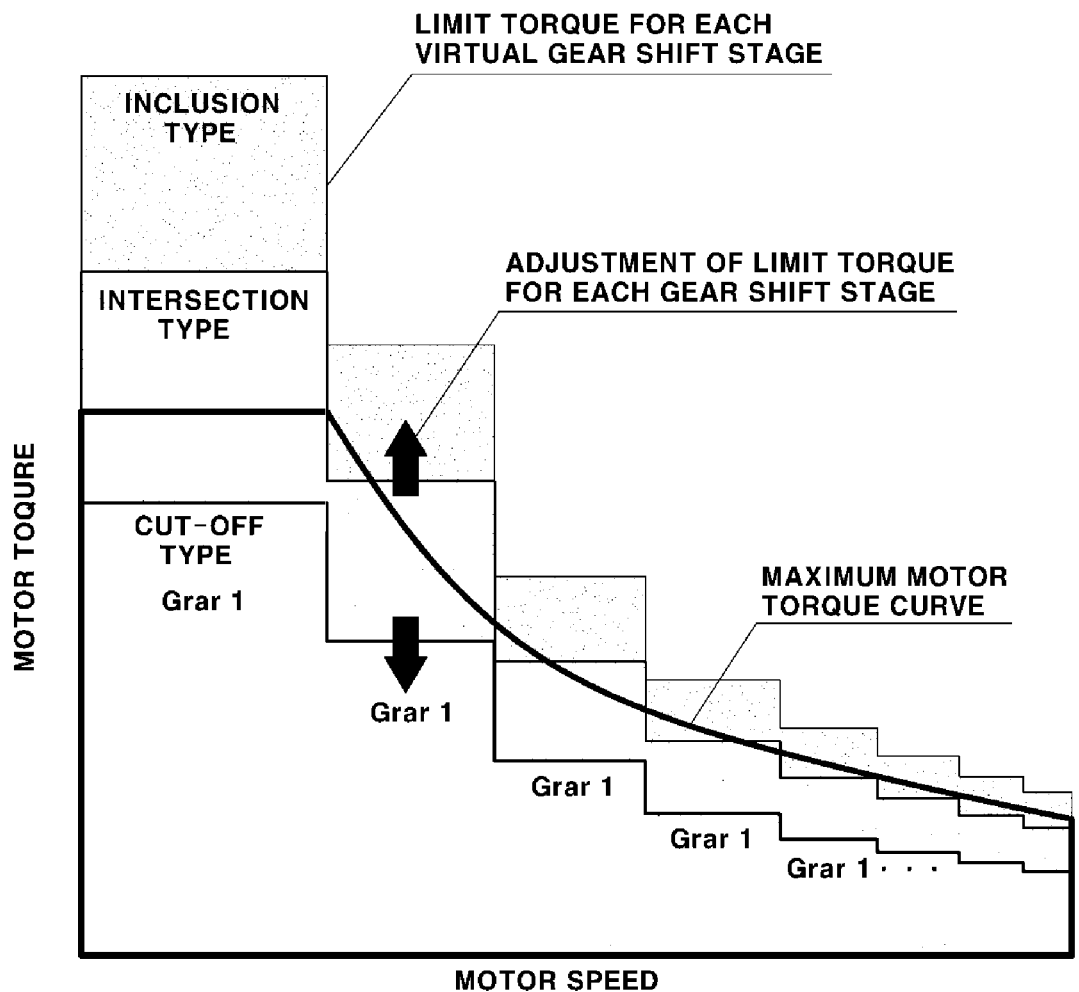
FIG. 6 is a view showing a maximum motor torque curve and limit torque for each virtual gear shift stage according to motor speed in the present disclosure.

FIG. 6 is a view showing a maximum motor torque curve according to the motor speed and limit torque for each virtual gear shift stage (Gear 1, 2, 3, 4, 5, . . . ) in the present disclosure. Referring to FIG. 6, it may be seen that the larger the speed of the motor, the greater the number of gear shift stages (i.e., the number of gears), and the greater the number of gear shift stages, that is, the higher the gear shift stage, the smaller the maximum motor torque.

In addition, as the number of gear shift stages increases, the gear ratio decreases, and the final wheel transmission torque decreases compared to the low gear shift stage at the high gear shift stage. The maximum motor torque curve is a curve representing a maximum allowable torque preset for each motor speed, and limit torque for each virtual gear shift stage may be calculated by applying the gear ratio information for each gear shift stage.

FIG. 6 shows various examples in which the limit torque for each virtual gear shift stage is determined, and as described above, the limit torque for each virtual gear shift stage (i.e., limit torque of current gear shift stage) may be calculated by multiplying all of the virtual gear ratio rGi corresponding to the virtual gear shift stage CurGe, the virtual final gear ratiorFg, and the limit torque setting parameters.

Accordingly, the magnitude of the limit torque for each virtual gear shift stage may be set according to the value of the limit torque setting parameter, and, referring to FIG. 6, it is shown that the limit torque for each virtual gear shift stage may be adjusted to a value above or below the maximum motor torque curve. As an example, the limit torque for each virtual gear shift stage may be set to a larger value than the maximum motor torque curve to include all thereof, as shown in FIG. 6, and in this case, it becomes possible to use maximum performance of the motor.

Alternatively, a curved line of the limit torque for each virtual gear shift stage may be set to be in a form crossing the maximum motor torque curve, wherein, in some areas of the motor speed for each virtual gear shift stage, the limit torque of the gear shift stage is set higher than the value of the maximum motor torque curve, and in the remaining areas, the limit torque may be set less than or equal to the value of the maximum motor torque curve. Accordingly, it may be possible to use the maximum performance of the motor in some areas of the motor speed for each virtual gear shift stage, and it may also be possible to realize the effect of the gear ratio difference between gear shift stages in some areas.

In addition, it may be possible to set the limit torque for each virtual gear shift stage to all values less than the maximum motor torque curve in the entire range of the motor speed, and in this case, it may be impossible to use the maximum performance of the motor, but it becomes possible to realize the effect of the gear ratio difference between stages to the maximum. Meanwhile, the final torque command generator 23 of the first controller 20 may be configured to receive the summed basic torque command from the torque command generator 21, and receive the virtual gear shift intervention torque command from the virtual gear shift controller 22.

The final torque command generator 23 may then be configured to correct the basic torque command generated by the torque command generator 21 using the virtual gear shift intervention torque command generated by the virtual gear shift controller 22, and at this time, in addition to the summed basic torque command, a virtual torque intervention torque command, which is a correction torque command for generating a virtual sensation of gear shifting, may be further added to generate a final torque command.

Figure 7:
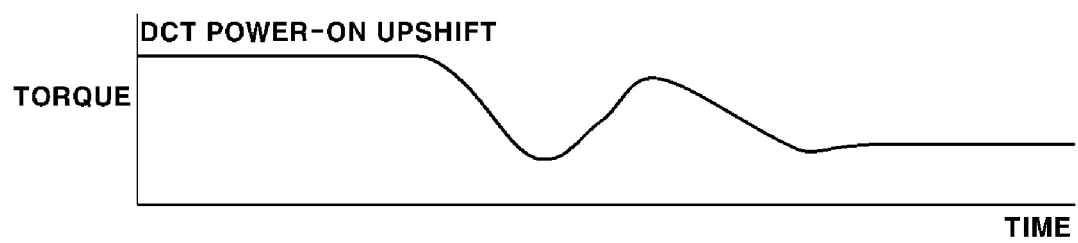
FIG. 7 is a view showing an example of a virtual gear shift intervention torque profile in the present disclosure.

FIG. 7 is a view showing an example of a virtual gear shift intervention torque profile in the present disclosure. Accordingly, the second controller 30 may be configured to receive the final torque command generated and output by the final torque command generator 23 of the first controller 20 and then operate the inverter to operate the driving motor 41 according to the received final torque command. As a result, it may be possible to realize a vehicle jerk phenomenon that occurs according to a gear shift effect during virtual gear shifting, similar to the gear shift effect of a real transmission when gear shifting.

In the virtual gear shift model of the virtual gear shift controller 22, the virtual gear shift intervention torque tqItv may be provided in the form of a torque profile with the virtual gear shift progress rate xProgress as an independent variable. Alternatively, the virtual gear shift intervention torque tqItv may be provided by a physical value reflected model based on information of virtual engine speed OmegaVir, target input speed based on virtual current gear shift stage (i.e., the virtual engine speed of the virtual current gear shift stage) OmegaCur, and target input speed based on virtual target gear shift stage (i. e., the virtual engine speed of the virtual target gear shift stage) OmegaTar.

In addition, in calculating the virtual gear shift intervention torque command, the form of the virtual gear shift intervention torque should be changed according to a type of transmission and a gear shift class, and the type of transmission may be divided into an automatic transmission (AT), a dual clutch transmission (DCT), and an automated manual transmission (AMT). The gear shift class may be divided into power-on upshift, power-off upshift (lift-foot-up), power-on downshift (kick-down), power-off downshift, near-stop downshift, etc.

To calculate the virtual gear shift intervention torque command, the current gear shift class may be determined by the virtual gear shift controller 22, and in the determination method, when the virtual target gear shift stage TarGe is higher than the virtual current gear shift stage CurGe (i.e., the virtual target gear shift stage>virtual current gear shift stage), the current gear shift class is upshift, whereas when the virtual target gear shift stage is less than the virtual current gear shift (i.e., the virtual target gear shift stage<virtual current gear shift stage), the current gear shift class is downshift. In addition, when the basic torque command is greater than a preset reference torque value, power-on is in operation, whereas when the basic torque command is less than a preset reference torque value, power-off is in operation.

Eventually, in the present disclosure, when the current gear shift class is determined based on the virtual current gear shift stage and the virtual target gear shift stage, etc., among the virtual gear shift intervention torque profiles for each gear shift class, a virtual gear shift intervention torque profile corresponding to the current gear shift class may be selected, and the virtual gear shift intervention torque for generating the virtual sensation of gear shifting may be determined in real time according to the selected virtual gear shift intervention torque profile.

At this time, a virtual gear shift intervention torque value corresponding to the current virtual gear shift progress rate may be determined from the selected virtual gear shift intervention torque profile. The virtual gear shift intervention torque profile is information set in advance for each gear shift class in the virtual gear shift model M of the virtual gear shift controller 22. In addition to the gear shift class, a differentiated virtual gear shift intervention torque profile may be set in advance according to the type of the gear shift. The magnitude of the virtual gear shift intervention torque may be adjusted by using, as a torque magnitude setting variable, the virtual engine speed OmegaVir, the accelerator pedal input value (APS value), the actual motor torque (i.e., the motor basic torque command generated by the torque command generator), and at least one or more of a combination of one or both of the virtual current gear shift stage CurGe and the virtual target gear shift stage TarGe.

Generally, as the magnitude of the motor torque (i.e., the basic torque command) increases, the magnitude of the virtual gear shift intervention torque is increased; as the gear shift stage becomes higher, the magnitude of the virtual gear shift intervention torque is decreased due to the gear ratio between the gear shift stages; and as the virtual engine speed increases, the decrease and increase extent of speed increases when gear shifting, whereby it is natural to increase the magnitude of the virtual gear shift intervention torque.

Further, even though the actual motor speed OmegaM is low, the virtual engine speed OmegaVir may be high. At this time, to simulate the behavior of a vehicle equipped with a transmission, the virtual red zone may be determined when the virtual engine speed OmegaVir is greater than or equal to a preset threshold speed value. In particular, the threshold speed refers to the maximum allowable rotational speed (rpm) of the engine, which is predetermined in a conventional internal combustion engine vehicle, and may be determined to have entered the red zone when the virtual engine speed exceeds the threshold speed (See step S15 of FIG. 3).

In the automatic gear shift mode, it may be possible to preset the gear shift schedule to perform gear upshifting before entering the red zone, so that it is not necessary to determine the virtual red zone, but when entering the manual gear shift mode, the virtual gear shift stage may be maintained until entering the driver's intent, and thus, it may be possible to enter the virtual red zone. In response to determining that the virtual red zone is entered, an engine fuel-cut situation may be simulated by performing virtual fuel-cut control, and the simulation may be implemented by generating a motor torque command that targets the threshold speed at which the virtual red zone starts to control the motor (See step S15 of FIG. 3).

For example, proportional torque reduction control or PID torque control using the error between the current virtual engine speed OmegaVir and the threshold speed may be performed. In another method, when the threshold speed is exceeded, the torque command may beset to a predetermined value to decelerate, and when the speed is decreased to less than the threshold speed, the torque by the driver's intent may be restored. In addition, in response to determining that the virtual red zone has been entered to simulate the fuel-cut situation, deliberate torque ripple may be additionally added to the basic torque command.

Figure 8:
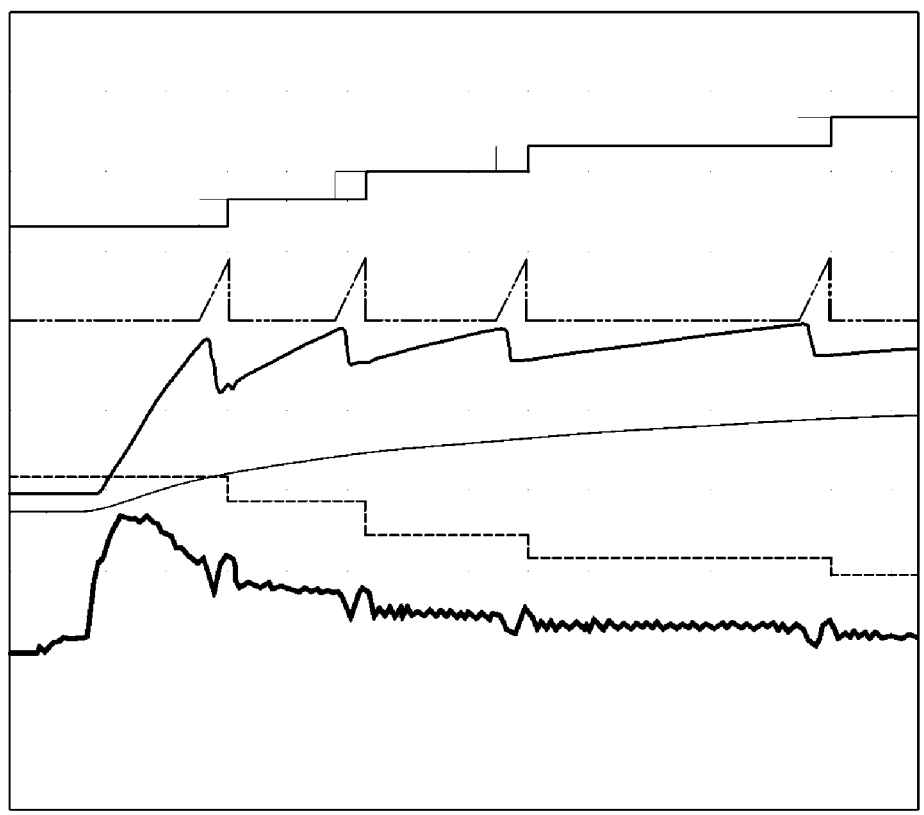
FIG. 8 is a view showing a gear shift state and a vehicle behavior state in a virtual gear shift process according to the present disclosure.

At this time, the torque ripple at the time of fuel-cut having a predetermined magnitude and period may be added to the basic torque command, thereby enabling vibration in a virtual fuel-cut situation. In addition, in all cases, when the basic torque command according to the driver's intent is less than the torque command that sets a threshold speed at which the virtual red zone starts as a control target of the virtual engine speed, the red zone control torque may be ignored and only the basic torque command according to the driver's intent may be applied. In this way, the control method for generating the virtual sensation of gear shifting of the electric vehicle according to the present disclosure has been described. FIG. 8 is a view showing a gear shift state and a vehicle behavior state in the virtual gear shift process according to the present disclosure.

Referring to FIG. 8, when the virtual vehicle speed is obtained from the actual motor speed OmegaM detected by the motor speed detector, the virtual target gear shift stage may be determined from the accelerator pedal input information and the virtual vehicle speed, and the gear shift simulating the virtual target gear shift stage may be performed. In addition, it may be possible to detect the acceleration state representing the vehicle behavior as the same in real gear shifting at every other time of each virtual gear shifting.

Meanwhile, in the present disclosure, when implementing a virtual gear shift function in an electric vehicle, the driver setting variables involved in generating the virtual gear shift is defined, and a variable value preset by a driver to generate the virtual sensation of gear shifting when driving, that is, the driver setting information described above may be reflected, and thus, each driver may be provided with a personalized and differentiated virtual sensation of gear shifting.

The driver setting variable may be the same as the above-described virtual gear shift intermediate variable, or may be different. For example, among the virtual gear shift intermediate variables shown in FIG. 2, the virtual final gear ratiorFg may be one piece of driver setting information that is input and set in advance by a driver, and the remaining virtual gear shift intermediate variables except for the virtual final gear ratio is a variable obtained from an input variable (which is predetermined vehicle driving information) for generating a virtual sensation of gear shifting in the virtual gear shift model.

The driver setting information is information that may be set, changed, and adjusted by a driver through a device that may be connected to a vehicle, such as a mobile device capable of communicating with the first controller 20 or the interface part 11 connected to the first controller 20 to generate a desired virtual sensation of gear shifting for personalization of the virtual sensation of gear shifting. In the present disclosure, the driver setting information may be input and set in the virtual gear shift controller 22 of the first controller 20 and used to generate the virtual sensation of gear shifting from the vehicle driving information in the virtual gear shift model M. In the present disclosure, even when the value of the input variable is the same in the virtual gear shift model M in the virtual gear shift controller 22, the value of the output variable such as the virtual gear shift intervention torque may be changed according to the driver setting information (i.e., the value of the driver setting variable).

The above-described virtual gear shift intermediate variable and driver setting variable are both variables obtained or used in the virtual gear shift model M in the virtual gear shift controller 22 for virtual gear shift control, and the virtual gear shift intervention torque which is a correction torque for generating the virtual sensation of gear shifting is a variable used in calculating or generating the torque command. In the present disclosure, driver setting information (i.e., variables related to generating virtual gear shifting) provided to enable a driver to set and adjust personalization of the virtual sensation of gear shifting are as follows:

- Number of gear shift stages
- Total gear shift time (i.e., gear shift speed)
- Magnitude of virtual gear shift intervention torque
- Form of virtual gear shift intervention torque
- Virtual final gear ratioFg
- Hysteresis between up-down gear shifts
- Gear shift schedule map
- Limit torque for each virtual gear shift stage
- Virtual idling speed
- Virtual idling vibration
- Virtual engine speed scale
- Fuel-cut threshold speed
- Magnitude of torque ripple during fuel-cut
- Period of torque ripple during fuel-cut In the present disclosure, at least one or more pieces of the driver setting information described above may be previously input and set to the controller, specifically, the virtual gear shift controller 22 of the first controller 20, and used to generate the virtual sensation of gear shifting.

Figure 9:
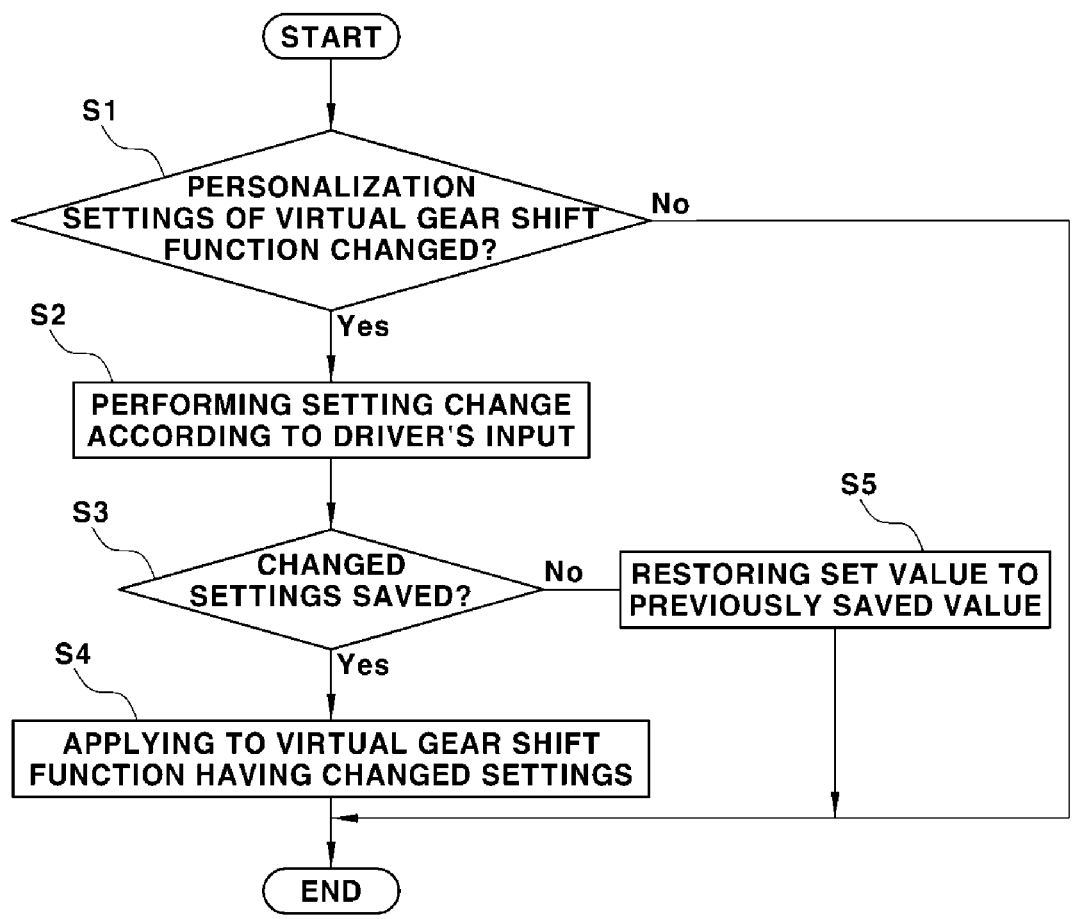
FIG. 9 is a flowchart showing a process of inputting and using driver setting information in the present disclosure.

FIG. 9 is a flowchart showing a process of inputting and using driver setting information in the present disclosure. The method described herein below may be executed by the controller. As shown in FIG. 9, the process of changing driver setting information may include: step S1, determining whether the driver has changed the personalized setting of the virtual shift function by inputting changed driver setting information through the interface part 11 or the mobile device; step S2, changing the driver setting information to the input information when there is a setting change; step S3 and S4, applying the stored information to the virtual gear shift function when the changed setting information is stored; and step S5, returning to the previous stored value when the changed setting information is not stored.

Hereinafter, each driver setting variable provided to be settable and adjustable in the present disclosure will be described in more detail.

Number of Gear Shift Stages

The driver may set the number of gear shift stages of the virtual transmission to be used. For example, it is possible to select one of multi-speed transmissions such as 4-speed to 8-speed transmissions. The setting of the number of gear shift stages of the virtual transmission may be implemented by way of being equipped with a virtual gear shift model and a gear shift schedule map individually based on the type of each transmission, and then by selecting and applying the virtual gear shift model M and gear shift schedule map of the corresponding transmission as a driver selects the type and number of gear shift stages desired by the driver.

Alternatively, after being provided with a virtual gear shift model and a gear shift schedule map having the largest number of gear shift stages selectable by the driver, it may also be implemented in a way that prevents entry to higher levels than the highest gear shift stage of the number of gear shift stages selected by the driver in the virtual gear shift model M and the gear shift schedule map. For example, when the maximum gear shifts selectable by a driver is 8 gears, after equipped with a virtual gear shift model and a gear shift schedule map of the 8-speed virtual transmission, the 7-speed and 8-speed entry may be prevented when the driver selects a 6-speed transmission.

In particular, since the number of gear shift stages is usually reduced, the virtual final gear ratioFg should be reduced compared to when selecting the 8th gear. At this time, the adjustment value of the virtual final gear ratioFg may be reflected in the value of the virtual speed SpdVir (km/h), which is the input of the gear shift schedule map, so that the entire virtual gear shift function may be implemented. The virtual vehicle speed SpdVir may be calculated as a value proportional to the value obtained by multiplying the actual motor speed OmegaM measured by the motor speed detector by the virtual gear ratioFg.

Total Gear Shift Time (Gear Shift Speed)

It may be possible for the driver to set and adjust the total gear shift time required when performing the gear shift. The gear shifting process has a torque phase in which magnitude of torque fluctuates, and an inertia phase in which slip and actual changes of the virtual engine speed occur (inertia phase), and the total gear shift time required when performing gear shift refers to the time, in which all the phases are performed, is summed.

When adjusting the gear shift speed, it may be possible to provide a function that individually adjusts the time of the torque phase and the inertia phase. Alternatively, it may be possible to adjust the summed time required, that is, the total gear shift time itself. When setting and adjusting the summed time required as described above, the ratio between the time of the torque phase and the time of the inertia phase may be maintained at a preset value.

In addition, as the driver increases the set value of the time required, the change rate of the virtual engine speed (i.e., the rate limit value) may be reduced. In other words, when a fast gear shift speed is desired, the time required is set to be short, and thus, the change rate of the virtual engine speed increases (i.e., a steep increase in engine speed), and when a slow gear shift speed is desired, the time required is set to be long, and thus, the change rate of the virtual engine speed may be decreased (i.e., a gradual increase in engine speed).

Magnitude of Virtual Gear Shift Intervention Torque

It may be possible to allow a driver to set the magnitude of the torque that intervenes when gear shifting, that is, the magnitude of the virtual gear shift intervention torque. In particular, the virtual gear shift intervention torque refers to torque that intervenes for generating a virtual sensation of gear shifting only, not torque for driving a vehicle. In other words, as described above, the virtual gear shift intervention torque is the correction torque added to the basic torque command for generating the virtual sensation of gear shifting.

When determining the magnitude of the virtual gear shift intervention torque, a batch personalization method is applicable, wherein the relative magnitude of the virtual gear shift intervention torque for each situation may beset in advance and may beset to be large or small based on the ratios. In particular, only one set value that controls the magnitude of the virtual gear shift intervention torque is changed.

In addition, it may be possible to provide a function for changing the magnitude of the gear shift intervention torque for each situation, rather than changing in a batch adjustment. In particular, along with the magnitude of the virtual gear shift intervention torque, a torque magnitude map may be selected or adjusted, the torque magnitude map using a combination of an accelerator pedal input value (APS value), a virtual engine speed, and a virtual target gear shift stage (or virtual current gear shift stage), or a combination of one or more variables selected therefrom.

Alternately, the torque magnitude map may be selected or adjusted for each known gear shift class such as power-on upshift, power-off upshift (lift-foot-up), power-on downshift (kick-down), power-off downshift, near-stop downshift, etc., and any combination of the above-mentioned situations may also be adjusted using composite inputs.

Form of Virtual Gear Shift Intervention Torque

It may be possible to allow a driver to select or set the torque that intervenes when gear shifting, that is, the form of the virtual gear shift intervention torque. In fact, in a vehicle equipped with a transmission, there is a difference in the sense of gear shifting based on the type of the transmission. To simulate this phenomenon, a driver may select a type of virtual transmission to determine the form of the virtual gear shift intervention torque for simulating the sensation of gear shifting of the corresponding transmission. In the present disclosure, setting the magnitude and form of the virtual gear shift intervention torque is meant to include selecting the type of transmission.

For example, among the types of transmissions such as the automatic transmission (AT), the dual clutch transmission (DCT), and the automated manual transmission (AMT), the desired type of virtual gear shift intervention torque may be selected. In addition, the present disclosure may further guide the driver to be able to visualize the form of torque.

Figure 10:
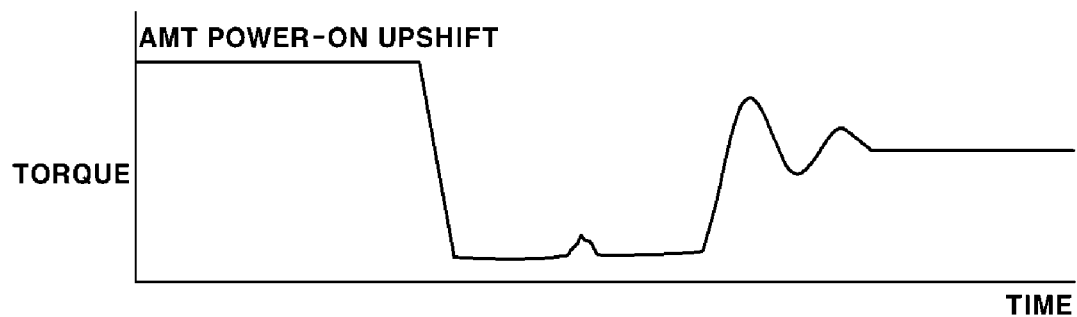
FIGS. 10 and 11 are views showing examples of the virtual shift intervention torque profile according to a type of virtual transmission in the present disclosure.
Figure 11:
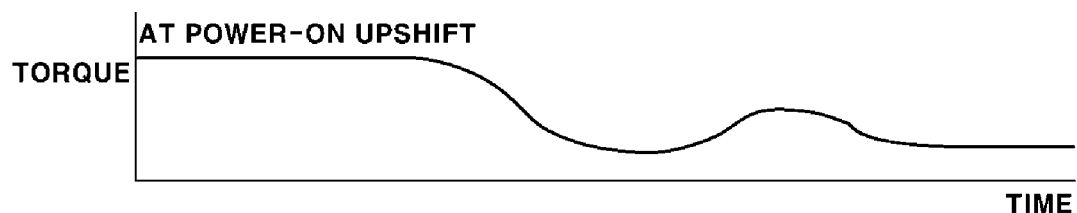

FIGS. 7, 10, and 11 are views showing examples of the virtual sensation of gear shifting depending on the type of the virtual transmission in the present disclosure, the horizontal axis represents time, and the vertical axis represents torque. The form of the gear shift torque indicates the form of the virtual gear shift intervention torque for each gear shift class based on the type of the virtual transmission, and examples of which are shown in FIGS. 7, 10, and 11. FIG. 7 shows the power-on upshift time of the DCT, FIG. 10 shows the power-on upshift time of the automatic manual transmission (AMT), and FIG. 11 shows the power-on upshift time of the automatic transmission (AT).

Figure 12:
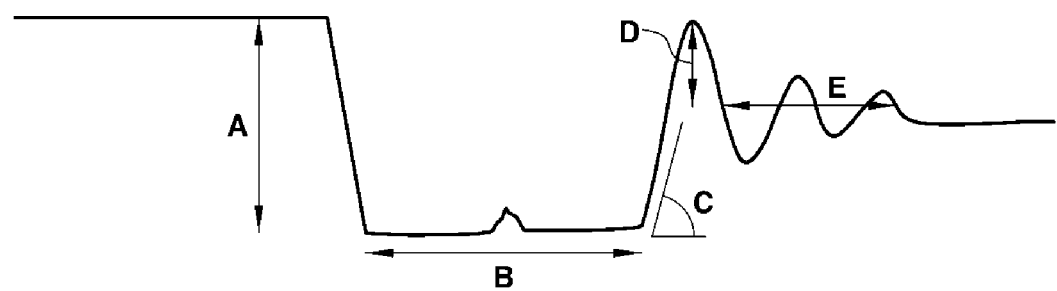
FIGS. 12 and 13 are views showing a method of personalizing a form of the virtual gear shift intervention torque according to the type of virtual transmission preferred by a driver in the present disclosure.
Figure 13:
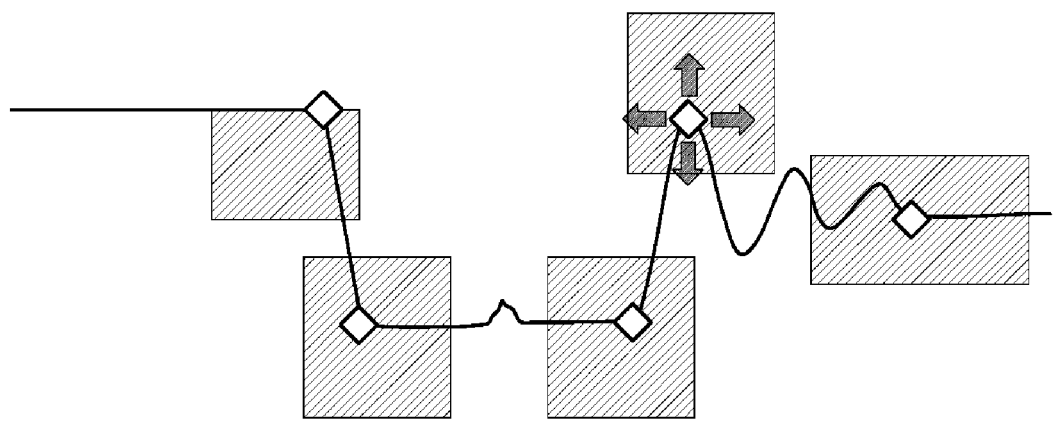

FIGS. 12 and 13 are views showing a method of personalizing the form of the virtual gear shift intervention torque depending on the type of virtual transmission desired by the driver in the present disclosure, and an example of power-on upshift (i.e., gear shift class) of the automatic manual transmission (i.e., transmission type) is shown. FIG. 12 shows an example of detailed items that may be adjusted by the driver.

In the present disclosure, the driver-adjustable detail items for setting the form of the gear shift torque may include torque cut amount A, torque cut time B, torque return ratio C, degree of push-feel D, and torque oscillation E, and the present disclosure allows the driver to adjust the values of these detailed items. Accordingly, a basic profile of the virtual gear shift intervention torque for each gear shift class may be provided by inputting in advance to the virtual gear shift controller 22 based on the type of the virtual transmission. The above detailed items are arranged as in the above A to E, and thus, the driver may adjust each detailed item in the basic profile. In other words, it may be possible to set the form of the virtual gear shift intervention torque by way of newly inputting or adjusting the value of each detailed item displayed on the screen of the interface part 11 or the mobile device.

As another method, as shown in FIG. 13, after displaying and providing a plurality of feature points for determining the form of the virtual gear shift intervention torque on a display screen of the interface part 11 or the mobile device, the present disclosure guides the driver to adjust the position of the feature points within an allowable area (i.e., hatched square area), thus allowing the form of the virtual gear shift intervention torque to be directly adjusted by the driver.

Virtual Final Gear ratiorFg

A driver may change a virtual final gear ratiorFg, and at this time, adjusting the virtual final gear ratio within the upper and lower limits thereof. When the value of the virtual final gear ratiorFg is decreased, a long gear is set, whereas when the value of the virtual final gear ratio is increased, a short gear is set.

Figure 14:
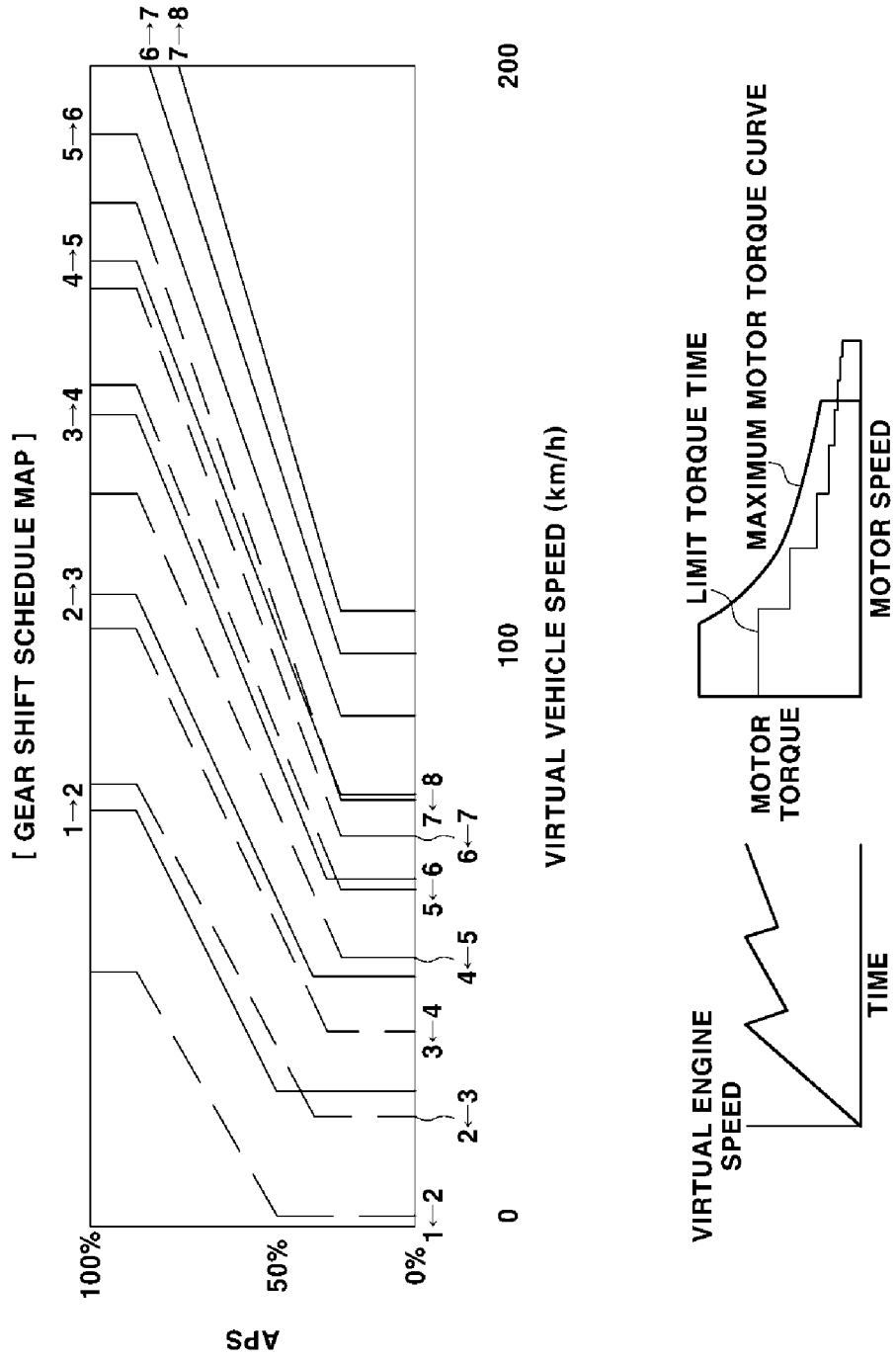
FIG. 14 is a view showing an example of long gear setting of a virtual final gear ratio in the present disclosure.

FIG. 14 shows an example of a long gear setting of a virtual final gear ratiorFg and FIG. 15 shows an example of a short gear setting thereof, wherein each gear shift schedule map, virtual engine speed, maximum motor torque curve according to motor speed, and limit torque for each virtual gear shift stage tqLmt are shown.

In the case of the long gear setting, as shown in FIG. 14, it is necessary to simulate a rare gear shift due to an effect of ratio increase between gear shifts, and in the case of the short gear setting, as shown in FIG. 15, it is necessary to simulate a close gear shift. This simulation may be implemented using a value multiplied by a virtual final gear ratiorFg when obtaining the virtual vehicle speed that is an input of the gear shift schedule map.

In addition, to simulate the difference in the magnitude of output torque due to the gear ratio change, when the limit torque for each virtual gear shift stages tqLmt described later is the short gear setting, it should be increased in proportion to the increased virtual final gear ratiorFg, and when being the long gear setting, it should be decreased in proportion to the decreased virtual final gear ratiorFg. This simulation may be implemented by obtaining a value multiplied the virtual gear ratio rGi corresponding to the virtual current gear shift stage CurGe and the limit torque setting parameter by the virtual final gear ratiorFg, when calculating the limit torque for each virtual gear shift stage tqLmt.

Gear Shift Schedule Map

The gear shift schedule map allows a driver to select a gear shift schedule map (i.e., gear shift map). In selecting the gear shift schedule map, a function of adjusting an individual gear shift schedule curve of the gear shift schedule map may be provided, but it is preferable to provide a limited adjustment function due to the fact that there are many complicated components in providing the entire function. One method is to choose one of several preset gear shift schedule maps: comfort, normal, and sport modes.

Figure 16:
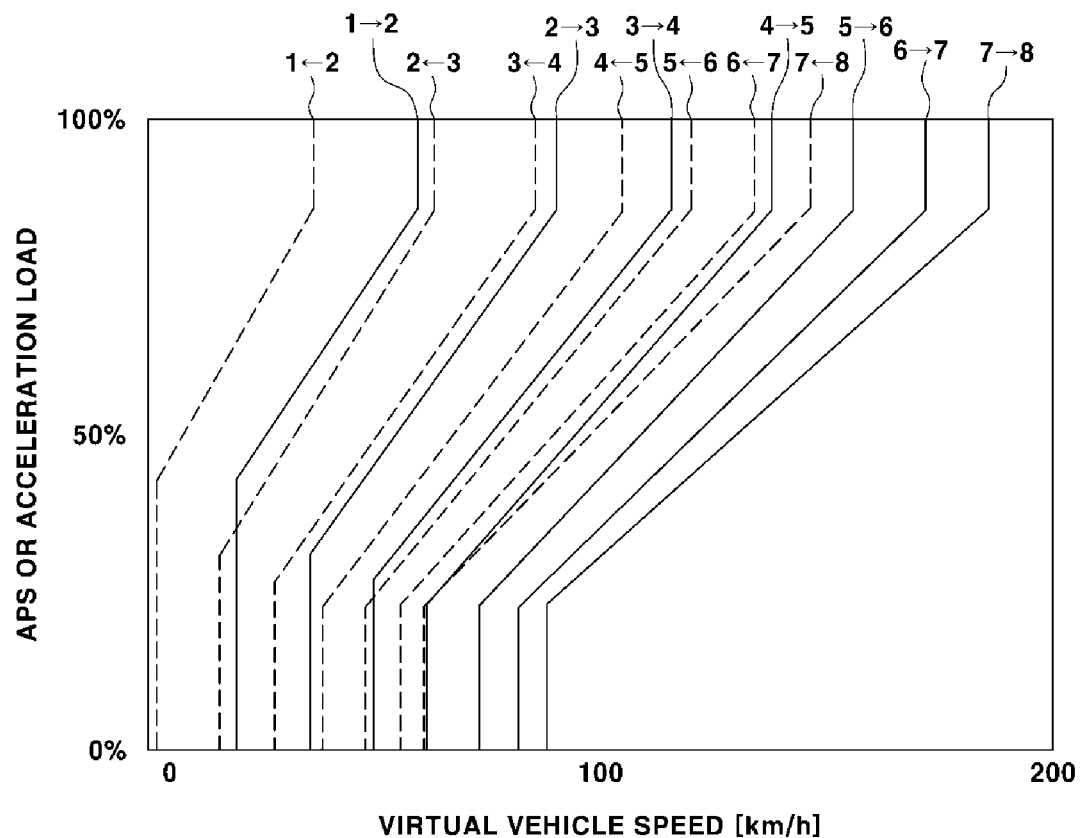
FIGS. 16 to 18 are views showing gear shift schedule maps that are predetermined to be selectable by the driver in the present disclosure.
Figure 17:
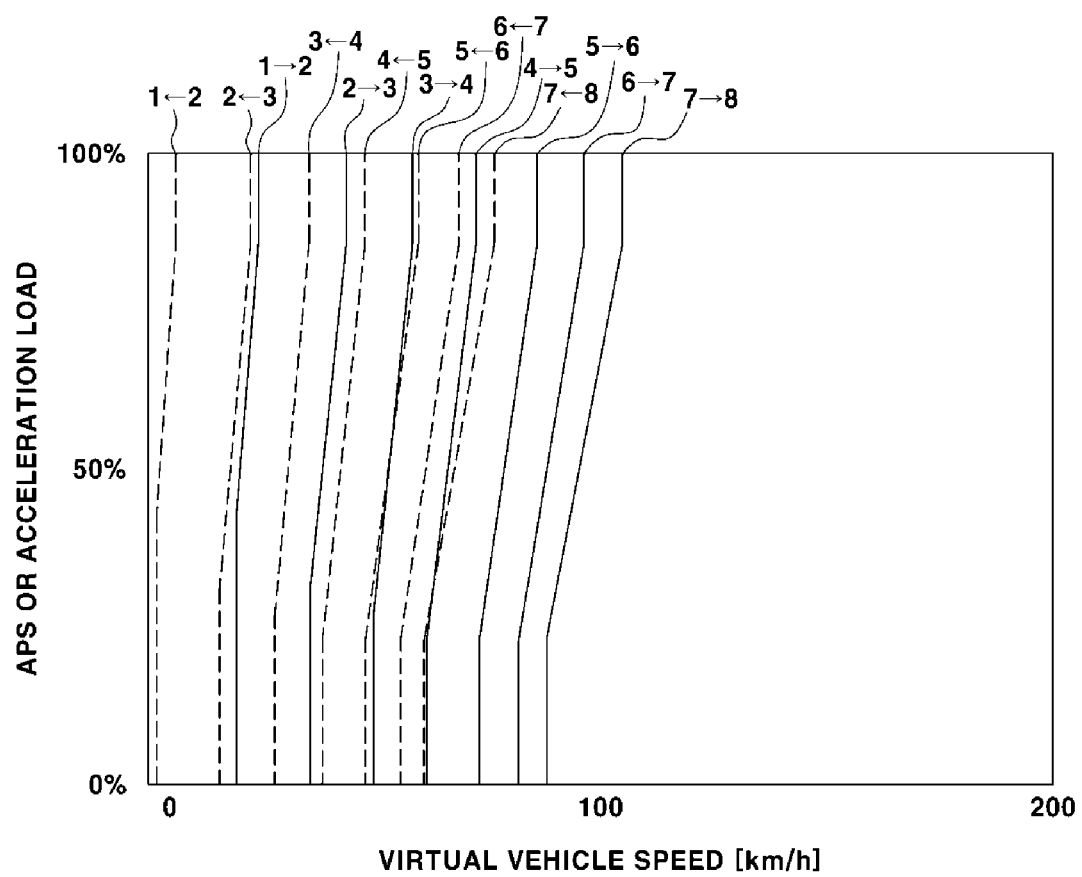
Figure 18:
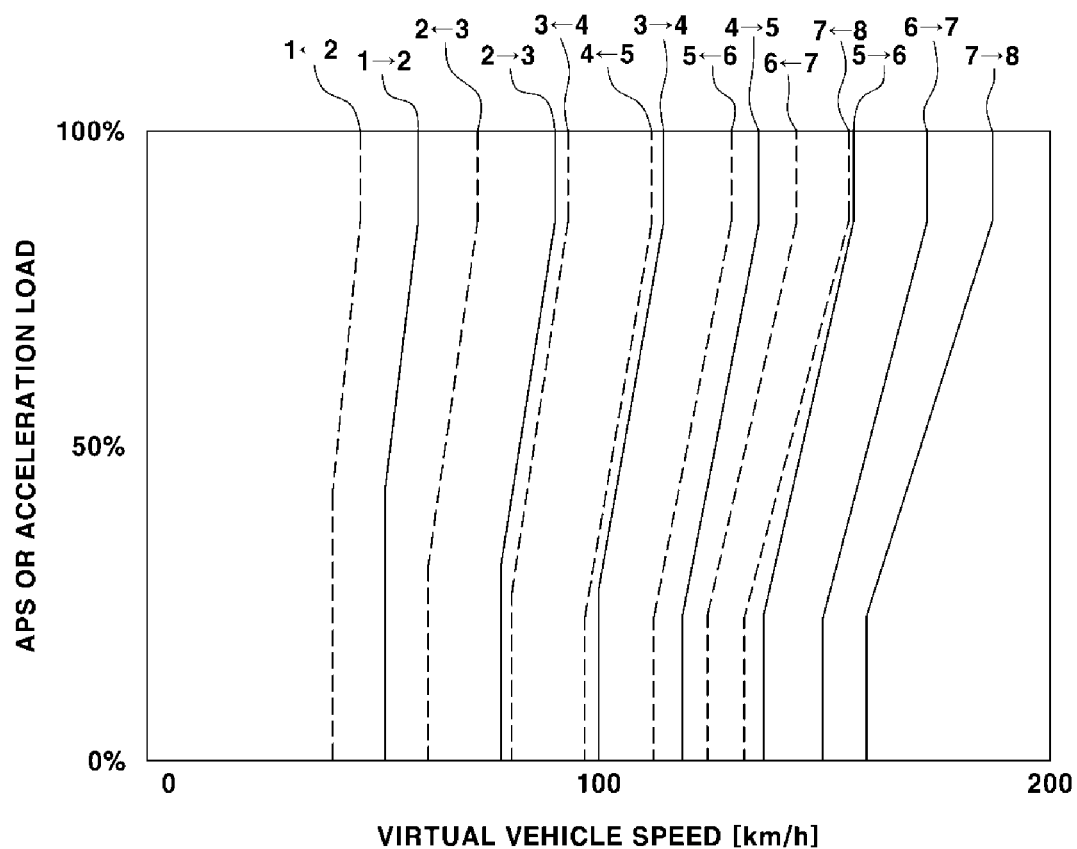

FIGS. 16 to 18 are views showing the shift schedule maps that are predetermined to be selectable by the driver in the present disclosure. FIG. 16 shows a gear shift schedule map in the normal mode, FIG. 17 shows a gear shift schedule map in the comfort mode, and FIG. 18 shows a gear shift schedule map in the sport mode. As illustrated, the horizontal axis of the gear shift schedule map represents a virtual vehicle speed (km/h), and the vertical axis of the gear shift schedule map may represent an accelerator pedal input value (APS value) (%) or an acceleration load.

The shift schedule map in the comfort mode is a shift schedule map set to use a high gear at a low speed as much as possible, thereby guiding to maintain the virtual engine speed OmegaVir as low as possible. The gear shift schedule map of the sport mode, on the contrary, uses the low gear as much as possible to maintain the virtual engine speed as high as possible, thereby guiding responsiveness and use of the maximum torque when driving in the sport mode. The reason that the gear shift schedule map of the sport mode may guide the use of the maximum torque despite of the virtual shift function is because the limit torque for each virtual gear shift stage is applied as described below.

Hysteresis Between Up-Down Gear Shifts

The change in hysteresis between upshift and downshift may be generated by adjusting the gear shift schedule maps for upshift and downshift (i.e., gear shift schedule curve), or may be implemented by the fix of the gear shift schedule map and the shift of the input axis (i.e., value of the vertical axis and horizontal axis of the map) used in the gear shift schedule map.

Figure 19:
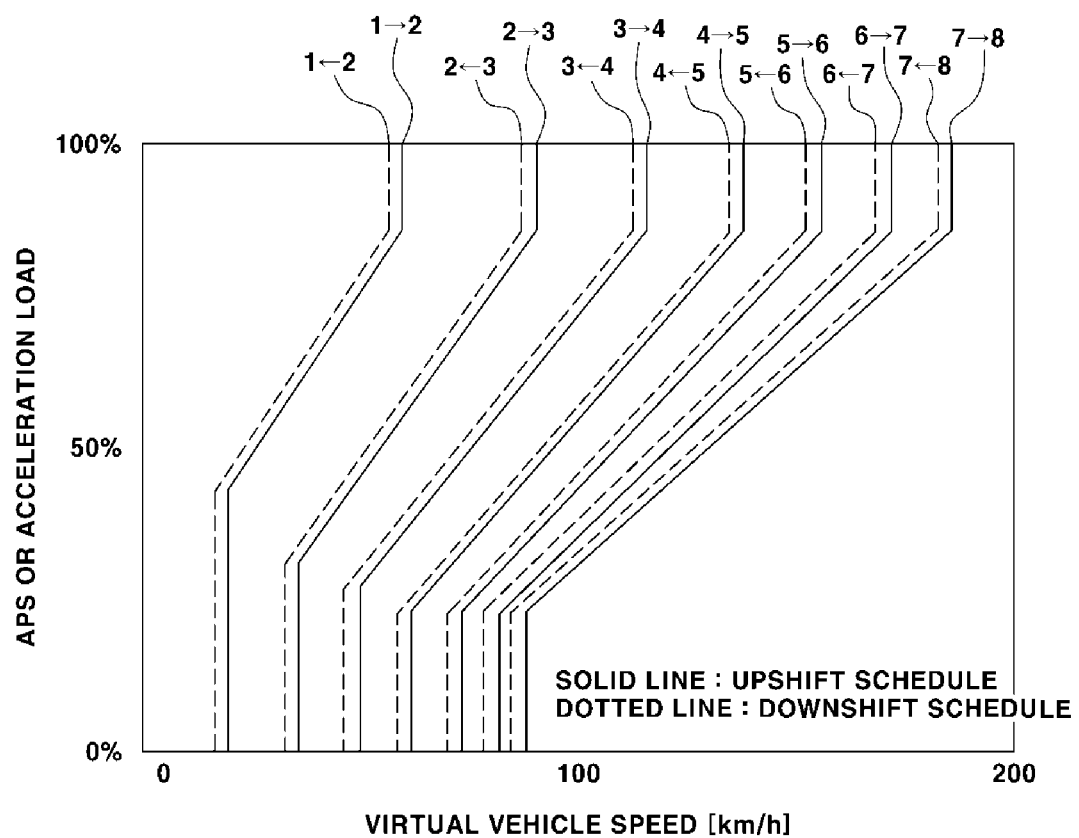
FIGS. 19 and 20 are views showing an example of hysteresis setting of the gear shift schedule map in the present disclosure.
Figure 20:
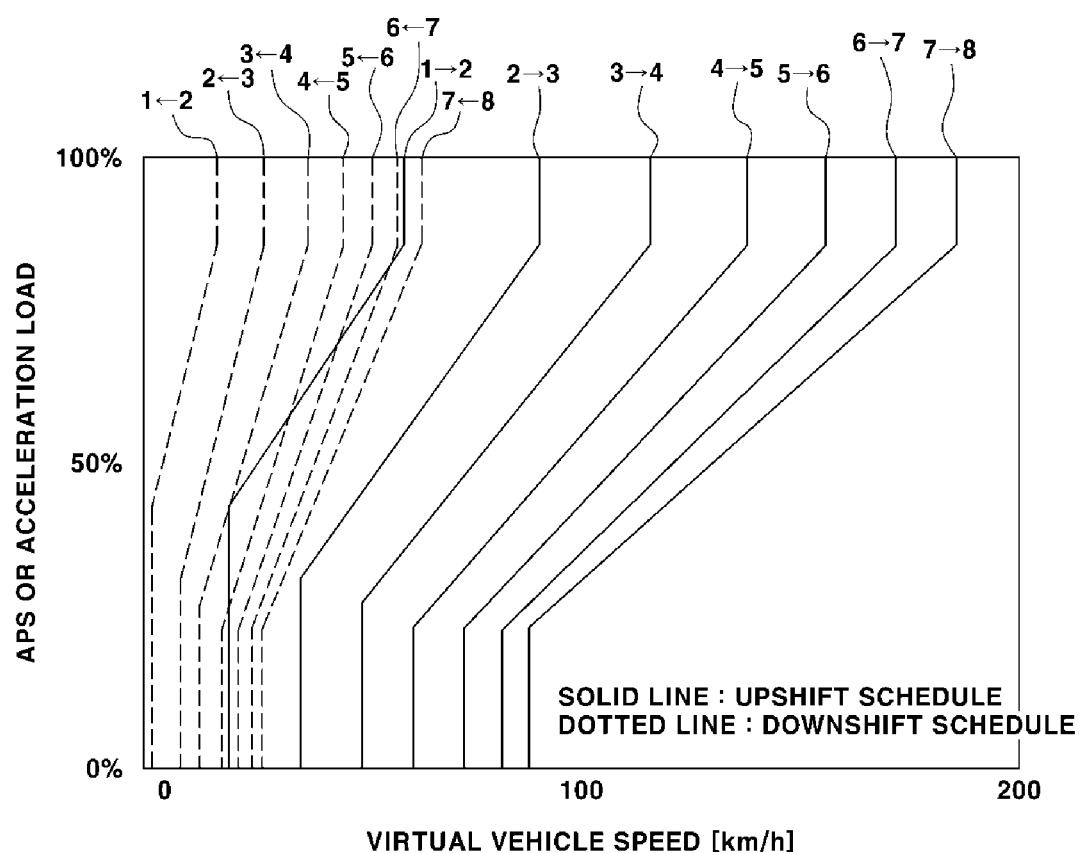

FIG. 19 is a view showing an example of hysteresis setting of the gear shift schedule map in the present disclosure, FIG. 19 shows an example of low hysteresis, and FIG. 20 shows an example of high hysteresis. The solid line in each view represents an upshift schedule curve, and the dotted line in each view represents a downshift schedule curve. In addition, in the gear shift schedule map, the horizontal axis represents a virtual vehicle speed (km/h), and in the gear shift schedule map, the vertical axis represents an accelerator pedal input value (APS value) (%) or an acceleration load.

As shown in FIG. 19, when the low hysteresis having a relatively small hysteresis shift value is applied, busy gear shift may occur, and as shown in FIG. 20, when the high hysteresis having a relatively large hysteresis shift value is applied, rare gear shift may occur.

Reduction of hysteresis (i.e., the low hysteresis in FIG. 19) allows instant gear shifting depending on speed or load, thereby increasing vehicle acceleration/deceleration responsiveness, enabling the driver to experience busy gear shifts, and being suitable for sport mode due to an increase of frequency of gear shifting. Conversely, the increase of the hysteresis (i.e., the high hysteresis in FIG. 20) may prevent busy gear shift due to even small fluctuations of the vehicle speed or load, and is suitable for the comfort mode because rare gear shift is achieved by lowering the frequency of gear shifting.

Since adjusting the hysteresis by adjusting the gear shift schedule map value may be complicated and may cause many objects to be adjusted, a virtual vehicle speed dualization method as one of shift methods of the input shaft may be applied. In other words, when gear upshifting, the virtual vehicle speed (which becomes the virtual vehicle speed for upshifting) is directly used in the gear shift schedule map, and when gear downshifting, a separate virtual vehicle speed for downshifting is used in the gear shift schedule map. At this time, the virtual vehicle speed for downshifting may be calculated by applying a preset scale factor and an offset value to the virtual vehicle speed (i.e., virtual vehicle speed for upshifting). Specifically, the virtual vehicle speed for downshifting may be obtained by multiplying a virtual vehicle speed (i.e., virtual vehicle speed for upshifting) by a scale factor greater than 1 and adding a positive offset value. In particular, hysteresis may be given between gear shifts while using a single map.

In the above, it has been described that the virtual vehicle speed is shifted by dualizing, which is the horizontal axis value among the variables used as the input of the gear shift schedule map (i.e., gear shift map), but instead of the virtual vehicle speed, it may be possible to shift by dualizing the accelerator pedal input value (APS value) or the acceleration load value, which is the vertical axis value, in the same manner. Alternatively, it may be possible to shift by dualizing both of the vertical axis value and the horizontal axis value, which are two input variable values of the gear shift schedule map.

Alternatively, the gear shift schedule maps for upshifting and downshifting may be separately provided to use, and in this case, there is no problem in that only a virtual vehicle speed serving as the reference speed is used.

Limit Torque for Each Virtual Gear Shift Stage

Next in a vehicle with a real transmission, as the gear upshift is performed, a torque multiplication effect between a front end and a rear end of the transmission is decreased due to a reduction in gear ratio. Eventually, even when the engine generates the same torque, the final acceleration is reduced. To simulate this effect, the present disclosure applies the limit torque for each virtual gear shift stage tqLmt in the virtual gear shift function, and the limit torque for each virtual gear shift stage may be used to limit the torque command at the corresponding virtual gear shift stage.

However, it is necessary to clarify a limitation for each gear shift stage to reliably generate such an effect. Since this value of the limit torque for each virtual gearshift stage should be applied within a range of the maximum torque curve and maximum equal power curve of the motor, there is the limitation that the maximum performance of the motor may not be used. Therefore, the present disclosure provides a function capable of adapting this part to the driver's selection.

In other words, to experience the effect of the gear ratio change by the virtual gear shift function in all situations, the limit torque for each virtual gear shift stage may be set to be positioned below the motor maximum torque curve. All the values of the limit torque for each virtual gear shift stage may beset to a value that is less than the value of the maximum motor torque curve. Conversely, to use the maximum performance of the motor in all situations, the limit torque for each virtual gear shift stage may be set to be positioned above the maximum motor torque curve. All the values of the limit torque for each virtual gear shift stage may beset to a value that is greater than the value of the maximum motor torque curve.

Alternatively, it may be adjusted between the two methods described above, and a curved line of the limit torque for each virtual gear shift stage may be set, to be in a form crossing the maximum motor torque curve. In some areas of the motor speed for each virtual gear shift stage, the limit torque of corresponding gear shift stage may beset greater than the maximum motor torque curve, and in the remaining areas, the limit torque may be set less than or equal to the value of the maximum motor torque curve. Accordingly, it may be possible to use the maximum performance of the motor in some areas of the motor speed for each virtual gear shift stage, and it may also be possible to realize the effect of the gear ratio difference between gear shift stages in some areas.

In the present disclosure, since the limit torque for each virtual gear shift stage tqLmt (which is the limit torque of the current gear shift stage) may be calculated by multiplying all of the virtual gear ratio rGi corresponding to the virtual current gear shift stage CurGe, the virtual final gear ratiorFg, and the limit torque setting parameters, with respect to the limit torque for each virtual gear shift stage as the driver setting information, the limit torque value for each virtual gear shift stage itself may be driver setting information that may be set and adjusted by the driver, and the limit torque setting parameter along with the virtual final gear ratiorFg may be driver setting information.

Virtual Idling Speed

The virtual idling speed allows the driver to adjust and set the engine speed (rpm) during virtual idling. When the vehicle is stopped in an electric vehicle, the motor speed (rpm) is zero. However, the actual engine maintains a rotational speed greater than the idling speed while the engine is turned on. To achieve this effect, the virtual idling speed may be set, which is used as a floor value of the virtual engine speed, to display the virtual idling speed in the cluster, or to output the virtual engine sound in conjunction with the virtual idling speed when idling. In the present disclosure, the virtual idle speed may be adjusted by a driver to the in-vehicle interface part 11 or a mobile device.

In addition, a function may be additionally applied, which allows the driver to adjust a separate virtual idling speed when the accelerator pedal is applied while the brake pedal is being applied at the time of stoppage or when there is driver's intent to perform a launch start through other input.

Virtual Idling Vibration

In the virtual idling, the actual motor 41 is stopped, but it may be possible to additionally apply vibrational torque to the motor in order to convey the sensation of idling to the driver. Accordingly, in the present disclosure, a function capable of enabling personalization for a driver by using the interface part 11 or the mobile device in the vehicle may be provided to set the magnitude and period of the vibrational torque.

In virtual idling, the first controller 20 may be configured to generate and output a vibrational torque command according to the magnitude and period set by the driver, and the second controller 30 may be configured to respond to the vibrational torque command input from the first controller 20, whereby the driving of the motor 41 may be controlled accordingly.

Virtual Engine Speed Scale

In the present disclosure, the virtual engine speed determined by the virtual gear shift controller 22 may be displayed on a cluster. At this time, the virtual engine speed may be displayed in the cluster for generating the sensibility and does not need to reflect the physical value of the actual motor. Therefore, in the present disclosure, it may be possible to allow the driver to adjust the scale of the virtual engine speed.

As the exemplary embodiment, a virtual engine speed between 0 and 100% may be displayed in the cluster using percentages. In addition, the virtual engine speed may be displayed as a value within a virtual value range in which limit speed of the actual motor is the highest value. In addition, the virtual engine speed may be displayed in a scale of about 0 to 6500 rpm, which is a range of engine speed, in an ordinary internal combustion engine vehicle. In addition, it may be possible to provide a function to enable selection of one of a predetermined custom scale.

Fuel-Cut Threshold Speed

The driver may designate fuel-cut threshold speed as a ceiling value of the virtual engine speed, that is, a threshold speed at which a virtual fuel-cut starts. The fuel-cut threshold speed is designated based on a value in a range selected from the virtual engine speed scale described above. For example, when the driver selects the percentage notation as a cluster notation method of the virtual engine speed, the speed corresponding to about 95% of the virtual engine speed may be designated and used as the fuel-cut threshold speed.

Magnitude and Period of Torque Ripple During Fuel-Cut

When the virtual fuel-cut function is activated, a torque command the driver intended is not applied, and instead, the torque command is applied to not exceed the fuel-cut threshold speed. At this time, the vibrational torque may be added to simulate the sensibility of the vehicle of the internal combustion engine, to allow the driver to adjust the magnitude and period of the vibrational torque ripple. In particular, it may be possible to simulate and add an analog emotion when the period frequency is 2 Hz or less, and it becomes possible to simulate and add digital or futuristic emotions when the period frequency is 2 Hz or more.

Although the exemplary embodiments of the present disclosure have been described in detail above, the scope of the present disclosure is not limited thereto, and various modifications and improvements of those skilled in the art using the basic concepts of the present disclosure as defined in the following claims are also included in the scope of the present disclosure.

What is claimed is:

1. A control method of generating a virtual sensation of gear shifting of an electric vehicle, comprising:
   determining, by a controller, a basic torque command in real time based on the vehicle driving information collected from the vehicle during driving of the electric vehicle;
   determining, by the controller, a virtual target gear shift stage based on the vehicle driving information collected from the vehicle and driver setting information input by a driver;
   determining, by the controller, a gear shift class from a virtual current gear shift stage and the determined virtual target gear shift stage and selecting a virtual gear shift intervention torque profile corresponding to the determined current gear shift class from among the virtual gear shift intervention torque profiles for each preset gear shift class;
   determining, by the controller, a virtual gear shift intervention torque for generating the virtual sensation of gear shifting in the real time according to the selected virtual gear shift intervention torque profile and generating a final motor torque command using the determined basic torque command, the virtual gear shift intervention torque, and the driver setting information input by the driver; and
   adjusting, by the controller, operation of a motor for driving the vehicle according to the generated final motor torque command.

2. The control method of claim 1, wherein first driver setting information includes at least one or more of the number of gear shift stages, a gear shift schedule map for determining the virtual target gear shift stage from the vehicle driving information, and hysteresis between up-down gear shifts.

3. The control method of claim 1, wherein second driver setting information includes at least one or more of total gear shift time, magnitude and a form of the virtual gear shift intervention torque of the virtual gear shift intervention torque profile for each gear shift class, and limit torque for each virtual gear shift stage for limiting the basic torque command.

4. The control method of claim 1, further comprising:
   calculating, by the controller, a limit torque of the current gear shift stage, a virtual gear ratio corresponding to the virtual current gear shift stage, a preset virtual final gear ratio, and a limit torque setting parameter,
   wherein, in the generating of the final motor torque command, the basic torque command of a value limited by the limit torque is used to generate the final motor torque command, when the basic torque command is greater than or equal to a calculated limit torque value.

5. The control method of claim 4, wherein, in the generating of the final motor torque command, the second driver setting information includes at least one of the virtual final gear ratio and the limit torque setting parameter used to calculate limit torque for each virtual gear shift stage for limiting the basic torque command.

6. The control method of claim 1, wherein, in the determining of the virtual target gear shift stage, first driver setting information includes a virtual final gear ratio and a gear shift schedule map; a virtual vehicle speed that is a reference speed is determined from an actual motor speed as the vehicle driving information detected by a motor speed detector and the virtual final gear ratio among the driver setting information; and the virtual target gear shift stage is determined from the virtual vehicle speed and a vehicle load value determined by the gear shift schedule map among the driver setting information.

7. The control method of claim 6, wherein the gear shift schedule map includes:
 a gear shift schedule map for upshifting used during upshift; and
 a gear shift schedule map for downshifting used during downshift.

8. The control method of claim 1, further comprising:
 determining, by the controller, a virtual vehicle speed from an actual motor speed detected by a motor speed detector and a preset virtual final gear ratio;
 determining, by the controller, a virtual engine speed using the determined virtual vehicle speed and virtual gear ratio information of the virtual current gear shift stage; and
 displaying, by the controller, the determined virtual engine speed on a cluster.

9. The control method of claim 8, wherein the virtual final gear ratio is the driver setting information that is input and set in advance to the controller by the driver.

10. The control method of claim 8, wherein a value of the virtual engine speed scale which is used to display the determined virtual engine speed on the cluster is the driver setting information that is input and set in advance to the controller by the driver.

11. The control method of claim 1, wherein one or both pieces of information about a virtual idling speed determined as a minimum value of the virtual engine speed for simulating an engine idling of an internal combustion engine vehicle and information about magnitude and a period of a vibrational torque command which is a motor torque command for generating vibrational torque by the motor during virtual idling are the driver setting information that is input and set in advance to the controller by the driver.

12. The control method of claim 1, further comprising:
 determining, by the controller, a virtual vehicle speed using an actual motor speed detected by a motor speed detector and a preset virtual final reduction gear ratio;
 determining, by the controller, a virtual engine speed using information of the determined virtual vehicle speed and a virtual gear ratio of the virtual current gear shift stage;
 comparing, by the controller, the determined virtual engine speed with a set threshold speed and determining, by the controller, that the virtual engine has entered a virtual red zone when the virtual engine speed is greater than or equal to the threshold speed; and
 performing, by the controller, virtual fuel-cut control to adjust motor operation by generating a torque command for reducing the virtual engine speed by targeting the threshold speed in a state of having determined an entry of the virtual red zone.

13. The control method of claim 12, wherein the controller is configured to adjust the motor operation using the torque command summed torque ripple during fuel-cut having magnitude and a period set in the torque command for reducing the virtual engine speed, during the virtual fuel-cut control.

14. The control method of claim 13, wherein at least one of the magnitude and periods of the torque ripple during the fuel-cut is the driver setting information that is input and set in advance to the controller by the driver.

15. The control method of claim 12, wherein at least one of the virtual final gear ratios and the threshold speeds are the driver setting information that is input and set in advance to the controller by the driver.

16. The control method of claim 1, wherein:
 the virtual gear shift intervention torque profile for each gear shift class is one piece of the driver setting information input and set in advance to the controller by the driver, and
 magnitude and a form of the virtual gear shift intervention torque corresponding to each gear shift class is set by the driver.

17. The control method of claim 1, wherein the driver setting information is input through an in-vehicle interface part connected to the controller or a mobile device communicatively connected to the controller.

* * * * *